United States Patent
Walton et al.

(10) Patent No.: US 12,435,475 B2
(45) Date of Patent: Oct. 7, 2025

(54) RAIL TIE DISTRIBUTION SYSTEM

(71) Applicant: Herzog Railroad Services, Inc., St. Joseph, MO (US)

(72) Inventors: Steven R. Walton, Olathe, KS (US); Jacob D. Herzog, St. Joseph, MO (US); Tony Shirk, Clarksdale, MO (US); Daniel T. Marshall, Leavenworth, KS (US); Damon Bailey, Rosendale, MO (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 884 days.

(21) Appl. No.: 17/652,844

(22) Filed: Feb. 28, 2022

(65) Prior Publication Data
US 2022/0275587 A1 Sep. 1, 2022

Related U.S. Application Data

(60) Provisional application No. 63/263,275, filed on Oct. 29, 2021, provisional application No. 63/155,042, filed on Mar. 1, 2021.

(51) Int. Cl.
*E01B 29/32* (2006.01)
*B61L 27/12* (2022.01)
(Continued)

(52) U.S. Cl.
CPC .............. *E01B 29/32* (2013.01); *B61L 27/12* (2022.01); *E01B 29/05* (2013.01); *E01B 29/06* (2013.01); *E01B 29/13* (2013.01)

(58) Field of Classification Search
CPC .......... E01B 29/32; E01B 29/06; E01B 29/05; E01B 29/13; B61L 27/12
(Continued)

(56) References Cited

U.S. PATENT DOCUMENTS

| 1,097,006 A | * | 5/1914 | Darden | .................... E01B 29/06 |
| | | | | 104/6 |
| 2,209,340 A | * | 7/1940 | Landry | .............. B65G 47/1471 |
| | | | | 198/443 |

(Continued)

FOREIGN PATENT DOCUMENTS

| CA | 2521978 A1 | 3/2006 |
| CH | 700017 B1 * | 6/2010 ............. B61D 15/00 |

(Continued)

OTHER PUBLICATIONS

TS Manufacturing, Unscramblers brochure, Believed to be on-sale or in public use on or before Mar. 4, 2020, admitted prior art.

(Continued)

*Primary Examiner* — S. Joseph Morano
*Assistant Examiner* — James William Jones
(74) *Attorney, Agent, or Firm* — AVEK IP, LLC; Kent R. Erickson

(57) ABSTRACT

A system for distributing rail ties along the side of a track from a rail car and consist of the rail cars is disclosed. Each rail car includes a floor conveyor conveying rail ties to a singulating conveyor assembly which advances rail ties individually to a dealer having an indexing mechanism which selectively releases individual rail ties onto a discharge chute. The discharge chute is oriented so ties dropped on the discharge chute are discharged out a selected side of the rail car. A controller on each rail tie distribution car communicates with a computing resource which implements a plan for selectively discharging ties from cars selected by the computing resource to discharge ties at selected drop off locations.

24 Claims, 18 Drawing Sheets

(51) Int. Cl.
*E01B 29/05* (2006.01)
*E01B 29/06* (2006.01)
*E01B 29/13* (2006.01)

(58) Field of Classification Search
USPC .................................................. 104/2, 5, 9
See application file for complete search history.

(56) References Cited

U.S. PATENT DOCUMENTS

| | | | |
|---|---|---|---|
| 2,445,950 A | 7/1948 | Jennings et al. | |
| 3,044,641 A * | 7/1962 | Code | B65G 59/067 |
| | | | 414/813 |
| 3,097,754 A * | 7/1963 | Franklin | B61D 47/00 |
| | | | 198/638 |
| 3,107,803 A | 10/1963 | Glosup et al. | |
| 3,701,320 A * | 10/1972 | Fearon | E01B 29/26 |
| | | | 104/6 |
| 3,802,347 A | 4/1974 | Rymes | |
| 5,038,914 A * | 8/1991 | Cotic | E01B 29/32 |
| | | | 198/397.06 |
| 5,347,934 A | 9/1994 | Dunnett | |
| 5,813,103 A * | 9/1998 | Girouard, Sr. | B23Q 7/055 |
| | | | 29/33 K |
| 5,904,098 A | 5/1999 | Theurer et al. | |
| 6,089,162 A * | 7/2000 | Madison | E01B 29/10 |
| | | | 104/5 |
| 6,112,670 A * | 9/2000 | Miller | E01B 29/06 |
| | | | 104/9 |
| 6,170,401 B1 | 1/2001 | Miller et al. | |
| 6,526,339 B1 | 2/2003 | Herzog et al. | |
| 7,162,327 B1 * | 1/2007 | Crozier | E01B 29/06 |
| | | | 700/213 |
| 7,437,997 B2 | 10/2008 | Herzog et al. | |
| 7,571,681 B2 * | 8/2009 | Haughey | E01B 29/10 |
| | | | 104/2 |
| 7,707,944 B2 | 5/2010 | Bounds | |
| 8,606,439 B2 | 12/2013 | Miller et al. | |
| 9,051,695 B2 | 6/2015 | Andes et al. | |
| 9,441,956 B2 * | 9/2016 | Kainer | B61L 23/045 |
| 9,598,822 B2 | 3/2017 | Mustard | |
| 9,701,485 B2 * | 7/2017 | Fréchette | B65G 15/44 |
| 9,981,675 B2 | 5/2018 | Cooper et al. | |
| 10,040,463 B2 | 8/2018 | Singh | |
| 10,138,603 B2 * | 11/2018 | Landes | B61D 7/02 |
| 10,521,739 B2 | 12/2019 | Tays et al. | |
| 2012/0192756 A1 * | 8/2012 | Miller | B61L 23/048 |
| | | | 701/19 |
| 2018/0281829 A1 | 10/2018 | Euston et al. | |
| 2020/0231193 A1 * | 7/2020 | Chen | G01N 21/8851 |
| 2020/0340187 A1 * | 10/2020 | Herzog | E01B 27/022 |

FOREIGN PATENT DOCUMENTS

| | | | |
|---|---|---|---|
| CN | 111945494 A | 11/2020 | |
| WO | WO-2009092895 A2 * | 7/2009 | E01B 29/06 |

OTHER PUBLICATIONS

Mellott Mfg. Co., Inc., Log and Lumber Handling Systems, Type 3 Unscrambler with Singulator Even-Ending Rolls brochure, Believed to be on-sale or in public use on or before Mar. 4, 2020, admitted prior art.

IPI Industrial Power, Inc., http://www.industrialpowerinc.net/me/industrial-power-inc/railroad-cross-tie-equipment-13892.html?navId=1636, Believed to be on-sale or in public use on or before Mar. 4, 2020, admitted prior art.

Froedge Machine & Supply Company Inc., Unscrambler brochure, Believed to be on-sale or in public use on or before Mar. 4, 2020, admitted prior art.

* cited by examiner

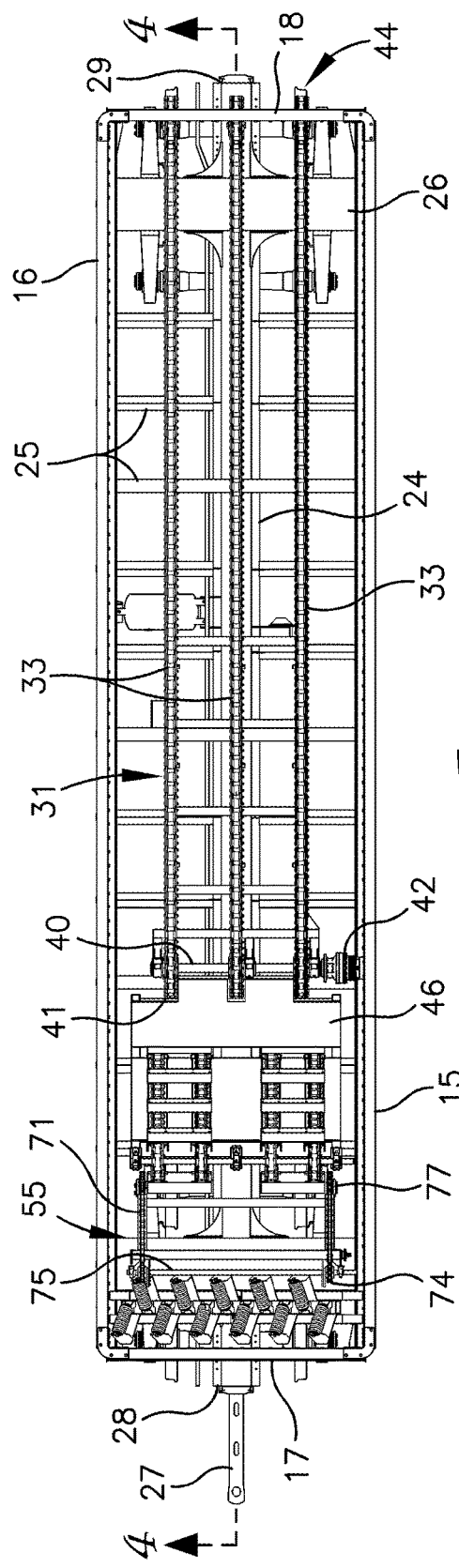
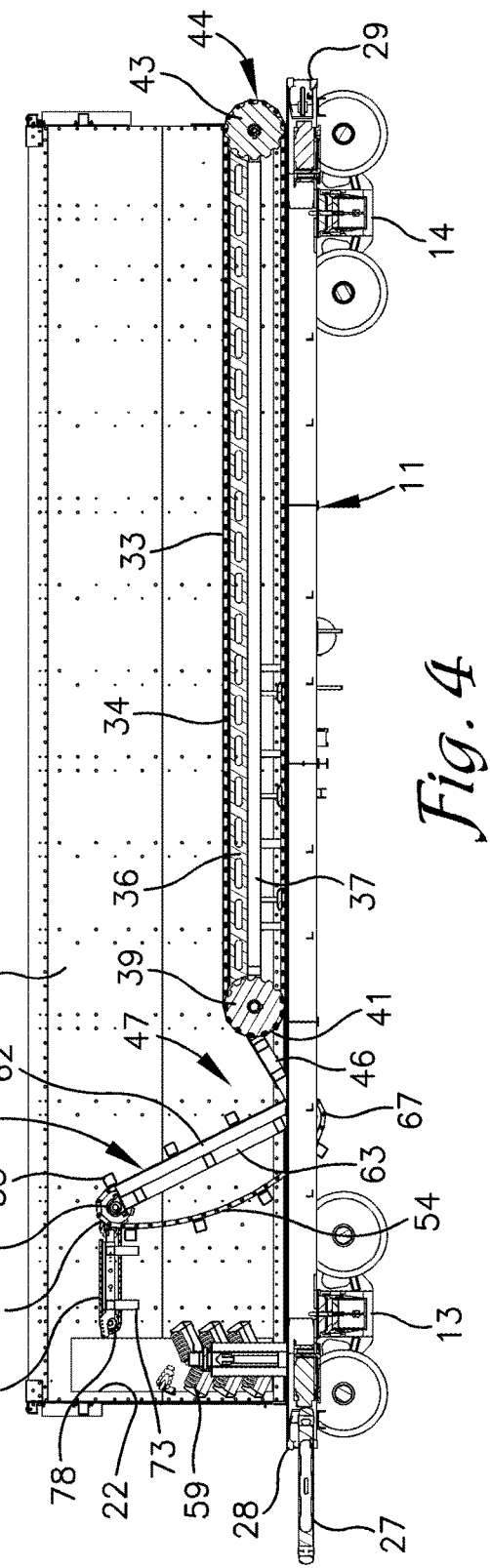
Fig. 3
Fig. 4

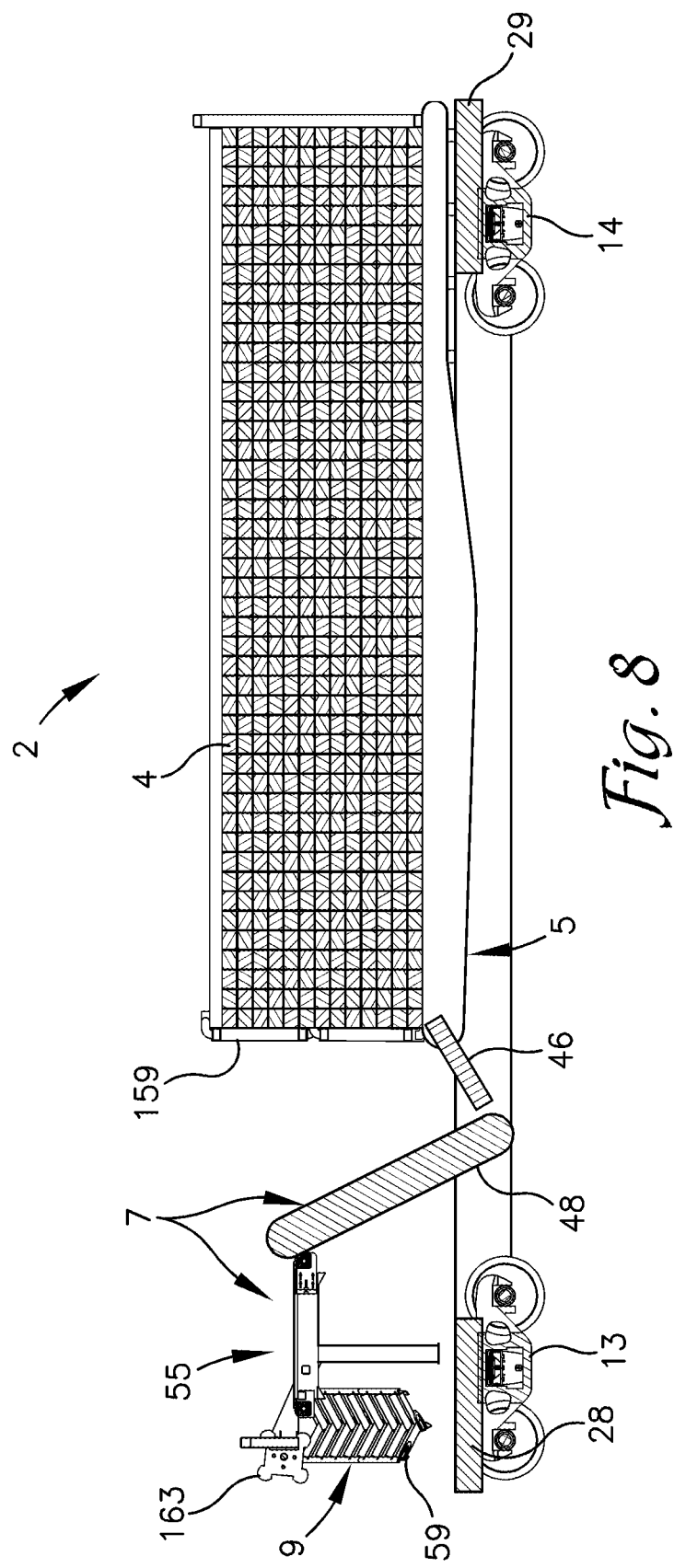

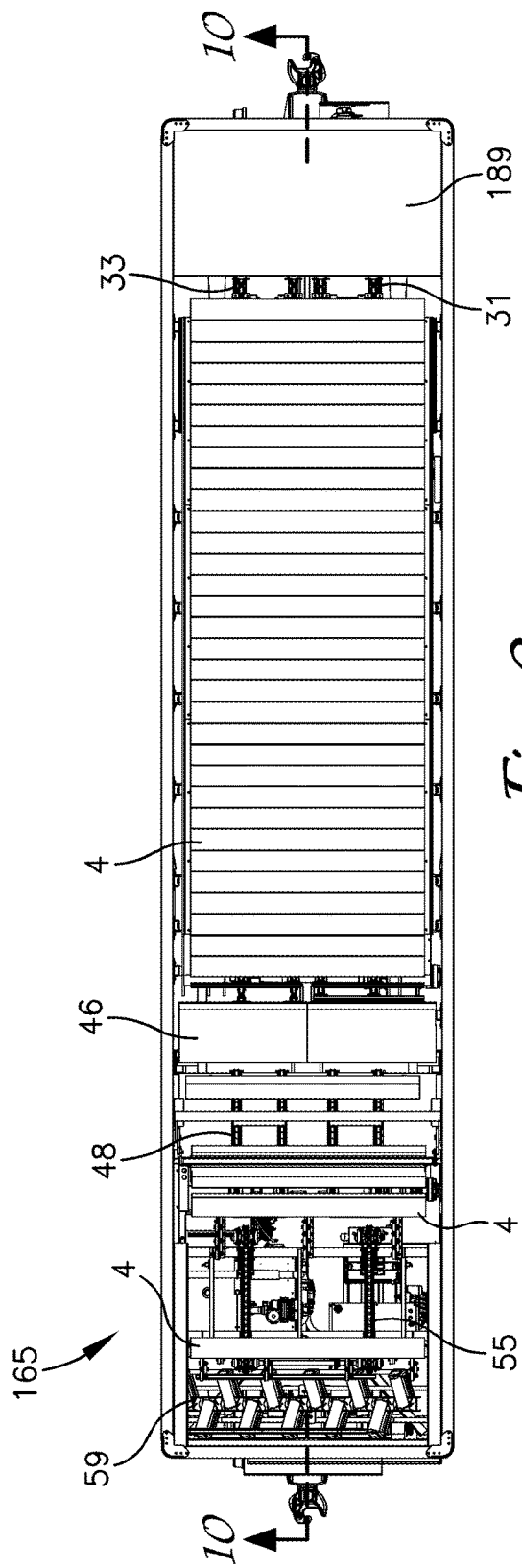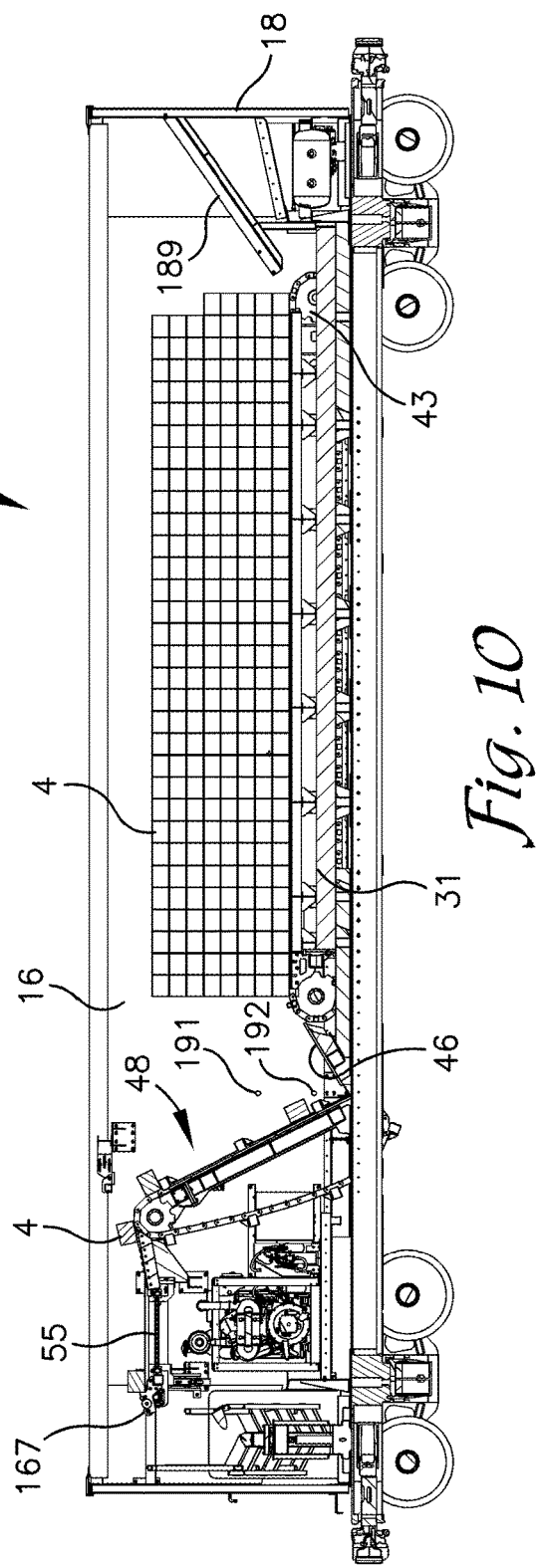

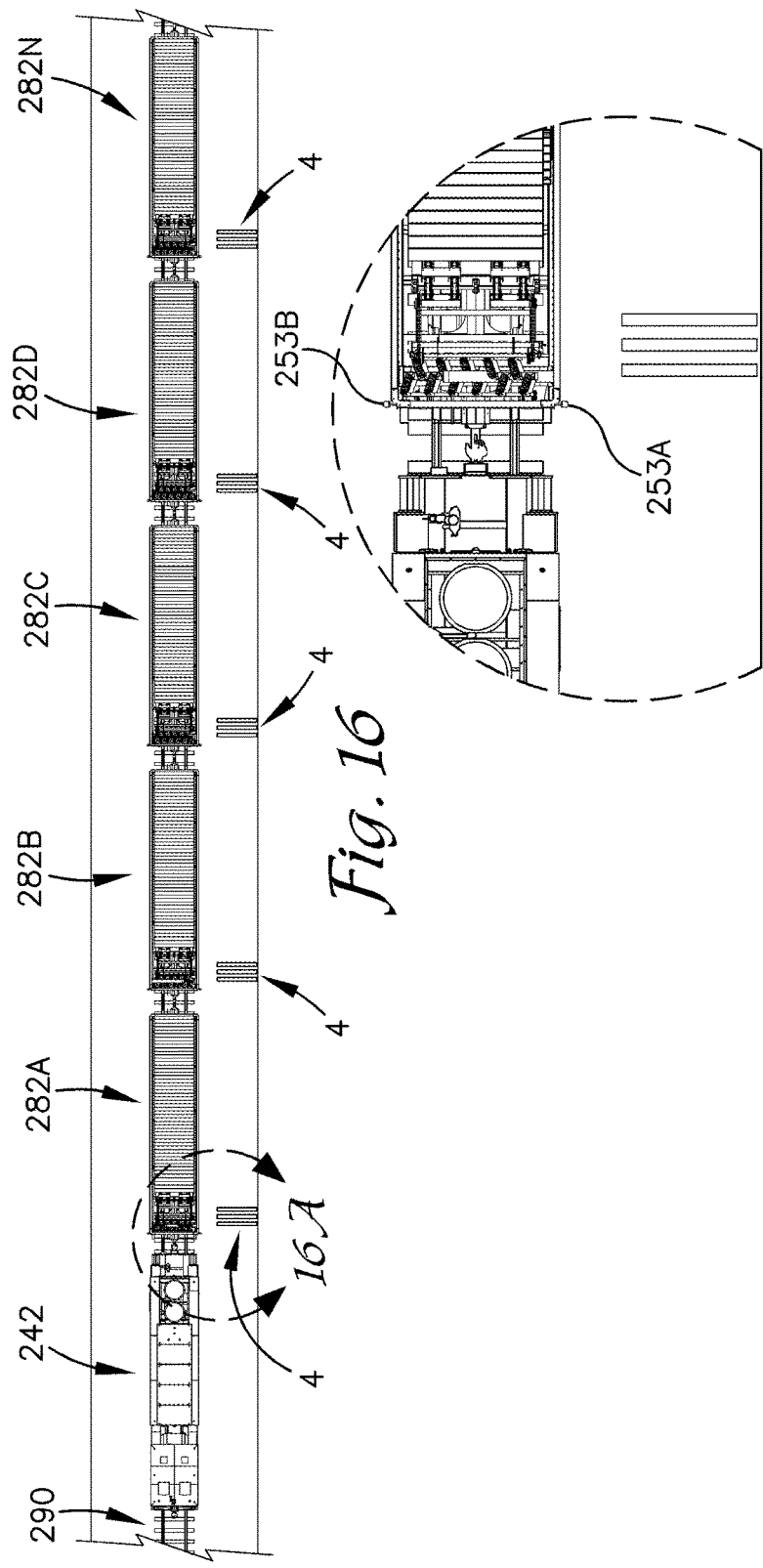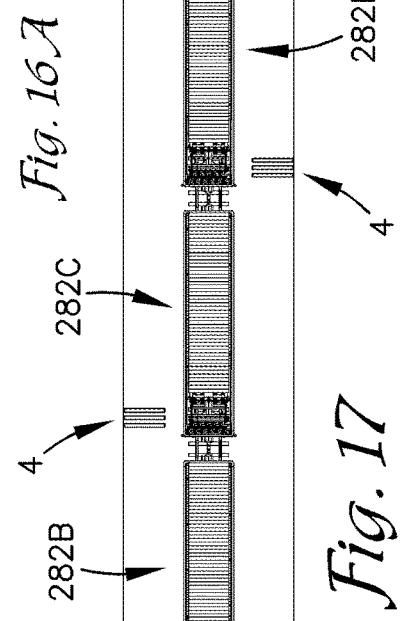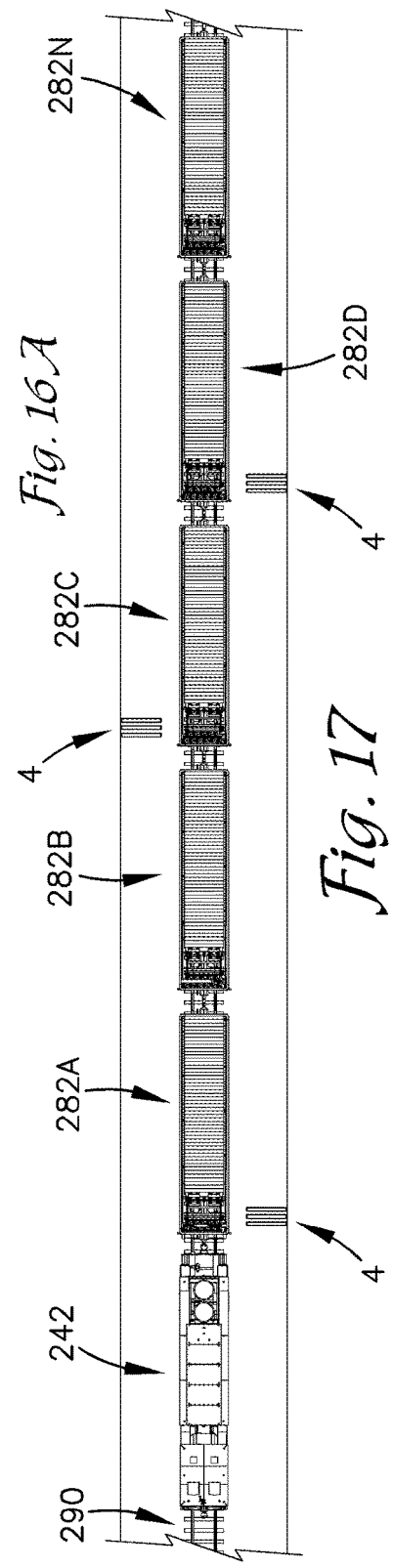

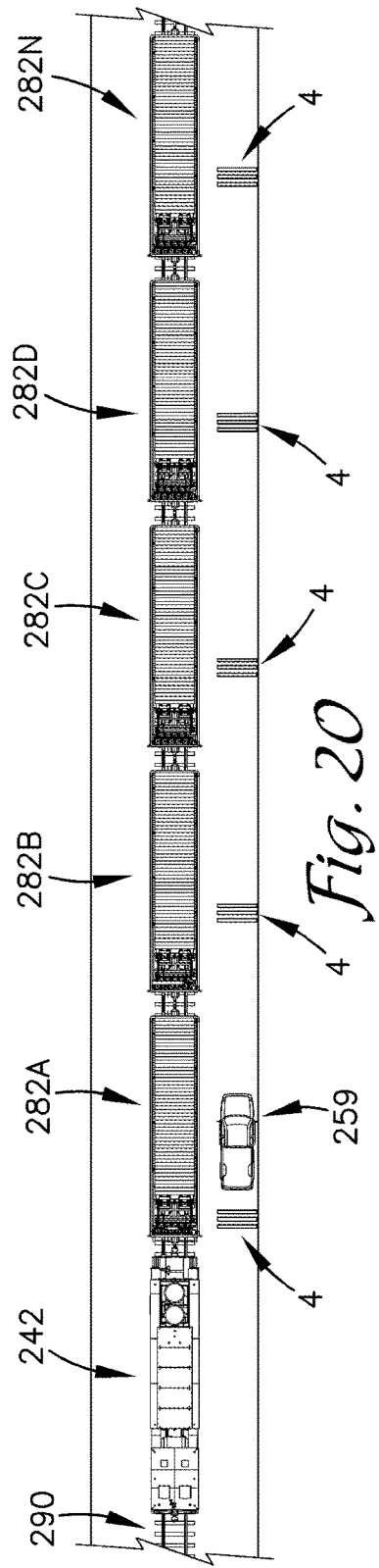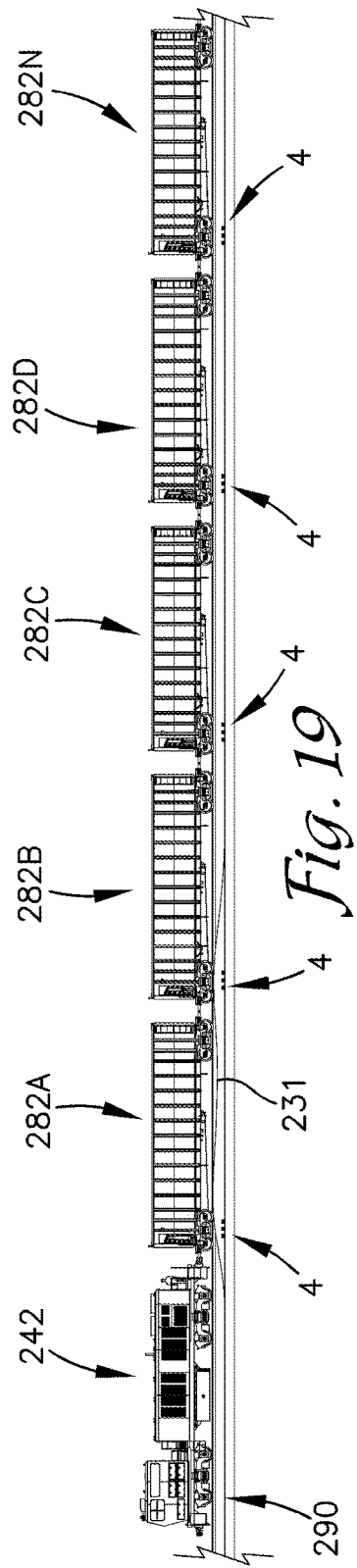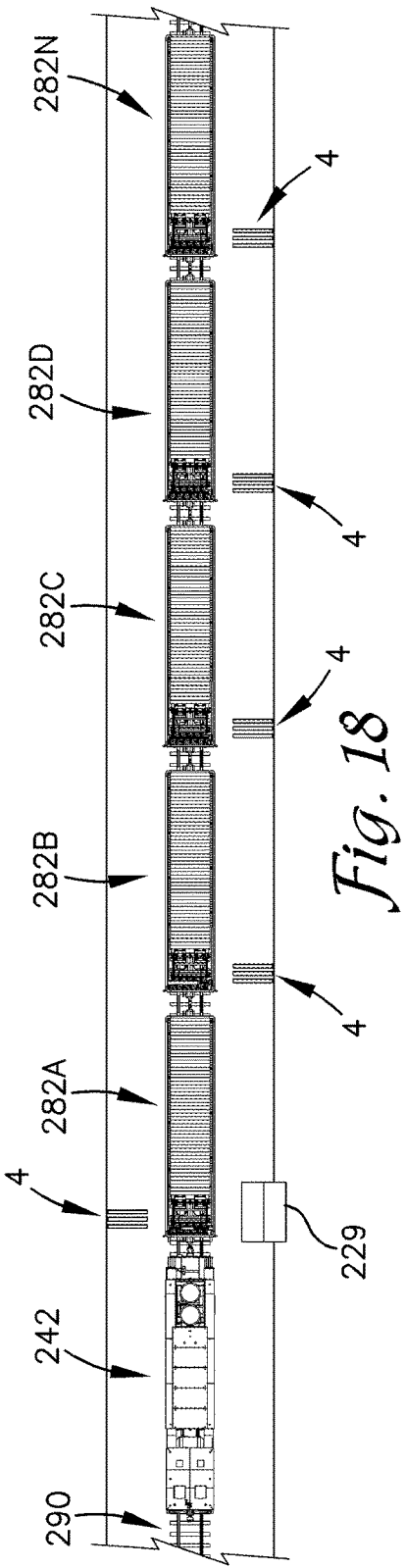

RAIL TIE DISTRIBUTION SYSTEM

CROSS REFERENCE TO RELATED APPLICATIONS

This application claims priority to U.S. Provisional Application, Ser. No. 63/155,042 filed Mar. 1, 2021, and titled "Rail Tie Distribution System," and to U.S. Provisional Application, Ser. No. 63/263,275 filed Oct. 29, 2021, and titled "Rail Tie Distribution Control System."

BACKGROUND OF THE INVENTION

Field of the Invention

This invention relates to equipment for hauling and distributing railroad track ties along a railroad track.

Description of the Related Art

Commonly used equipment for distributing railroad track ties along a railroad track requiring maintenance includes a consist of gondola cars or other hopper cars in which rail ties or bundles of rail ties are stored for transport and an unloader type vehicle with flanged wheels adapted to allow the unloader to travel along the tops of the gondola cars using the upper ends of the gondola car sidewalls as rails. US Patent Application Publication No. 2003/0205162 of Stanley Herzog et al. discloses a railway maintenance machine including a crawler type service vehicle or unloader adapted to travel over and across a consist of gondola cars for performing various operations associated with railroad maintenance including unloading of rail ties using a jaw unit attached to the end of the boom of the unloader. The jaw is adapted to lift a plurality of ties or a bundle of ties and selectively place the ties along a section of track in which existing ties are to be replaced. In use, a prior survey of the section of track is conducted to identify rail ties needing replacement, and using the survey data, the operator of the unloader sets out a bundle of a known quantity of ties at a location along the track where a similar number of ties are to be replaced. Separate equipment and a separate procedure are then required to position the ties next to the ties to be replaced.

U.S. Pat. No. 3,107,803 discloses a tie unloading machine which travels on rails on the sides of an open top rail car containing ties and uses a forklift type mechanism for lifting rail ties from the car. A chain driven ejector blade on an ejector device is mounted on the forklift frame at a height above the sides of the rail car. The ejector device can be operated to eject rail ties laterally relative to the side of the rail car as the rail ties are raised into the path of the ejector blade by the fork-lift. Efficient utilization of the unloading machine requires the rail ties to be stacked neatly in uniform stacks in the rail car. The unloading machine incorporating the forklift type lifting mechanism is a custom-built device which is not suited for other uses. The height at which the ties are ejected increases the likelihood that the rail tie will land too far from the track to be within the reach of equipment used to replace an existing tie with the replacement tie.

U.S. Pat. No. 3,162,145 discloses a tie car with elongated openings formed along the whole lower edge of each side wall member to permit discharge of the ties contained in the car out the openings on either side. A tie unloading machine moves on rails mounted on the bottom of the car to engage the ties in a stack and uses a kicker head plate on a kicker chain to engage the bottom tie in the stack and move the bottom tie transversely and out through one of the openings. It is believed that attempting to eject a railroad tie from the bottom of a stack of railroad ties would prove difficult to complete and because the tie unloading machine moves relative to the tie car determining the specific location of the unloading machine and the tie to be ejected may prove difficult to coordinate for precision unloading.

U.S. Pat. No. 4,911,599 to Theurer et al. discloses tie handling equipment including an unloader adapted to travel on the sidewalls of a consist of open top rail cars in which rail ties can be stored in combination with a crane and conveyor system which can move across the tops of the rail cars for conveying to the end of the consist rails fed onto the conveyor system by the unloader. The system disclosed by Theurer et al. is also adapted for use with rails that are loaded into the rail cars in orderly stacks.

U.S. Pat. No. 6,170,401 discloses a system for ejecting the ties laterally off of a ramp extending from the end of a rail tie distribution car. An operator seated proximate the end of the ramp controls the timing of the ejection using a chain conveyor with two striker plates. A shield mounted on an arm is used to control deflection of the ejected tie to direct the tie to a desired spot along the side of the rails.

U.S. Pat. No. 7,162,327 discloses use of an excavator or unloader type machine traveling across the tops of gondola cars to distribute ties from the gondola cars to the sides of the track. The coordinates for dispensing the ties are determined in advance using surveys, stored in a central database, and fed to the excavator or unloader type machine. An operator manually controls the distribution of ties.

U.S. Pat. No. 7,437,997 discloses a method for delivering replacement rail ties using GPS techniques. The patent discloses conducting a survey and associating GPS coordinates with a location corresponding to a defective tie that needs to be replaced. A tie replacement train with a tie unloading machine then traverses the section of track and ties are offloaded using the tie unloading machine at the locations determined by GPS coordinates corresponding to a defective tie.

There remains a need for a rail tie distribution system which can be used to efficiently, precisely, and safely unload individual rail ties at selected locations along a railroad track.

SUMMARY OF THE INVENTION

A rail tie distribution system of the present invention includes at least one rail car in which a plurality of rail ties may be stored, a rail tie feeder, a rail tie singulating means and a rail tie discharge means. The rail tie feeder feeds rail ties from the rail car to the rail tie singulating means. The rail tie singulating means singulates rail ties received from the rail tie feeder and advances the rail ties individually to a discharge means which is operable to selectively discharge individual rail ties out at least one side of the rail car and preferably out either side of the rail car onto the side of a track.

In one embodiment each rail tie distributing car comprises a rail car frame supported on dedicated trucks. The rail tie feeder comprises a live bottom conveyor supported on the frame of the car and enclosed by sidewalls extending on either side of the live bottom conveyor. The live bottom conveyor is sized to receive a plurality of rail ties and forms a floor of the rail car. The singulating means may be mounted on the rail car frame and positioned to receive rail ties conveyed off an end of the live bottom conveyor. The singulating means may comprise a singulating conveyor assembly including a lift conveyor or descrambler conveyor. The descrambler conveyor comprises a plurality of tie engaging members on a plurality of conveyor chains, the tie engaging members engaging rail ties conveyed from the live bottom conveyor to the singulating conveyor assembly. The descrambler conveyor extends upward from the rail car frame at an angle of at least forty-five degrees and the tie engaging members engage and lift the rail ties individually and advance the rail ties individually toward a dealer. The dealer comprises an outfeed conveyor and an indexing mechanism at a distal end thereof which is operable to allow rail ties to drop individually onto a discharge chute. The dealer and the discharge chute form a discharge assembly and comprise means for discharging rail ties from the rail tie distribution car. The discharge chute is pivotable to slope downward toward either side of the rail tie distribution car and in alignment with an opening in the sidewall of the rail car to allow rail ties to be selectively discharged through the openings on either side of the rail car and onto the side of a track.

A power supply, computer processor and GPS antenna are preferably supported on the undercarriage of the rail tie discharge assembly of each of the embodiments to control the operation and positioning of the assembly to deliver individual or a plurality of ties to selected locations along the track on which the consist moves based upon instructions processed by the computer processor. It is foreseen that the main processor and GPS antenna could be located elsewhere on the consist with the movement and operation of the rail tie discharge assembly controlled by separate controllers or processors linked to the main processor and GPS antenna.

In one embodiment, a plurality of the rail tie distribution cars may be connected together in a consist. Each of the plurality of rail tie distribution cars has a distribution car controller the operably associated with each of the rail tie distribution cars to control the operation of the rail tie discharge means of each of the rail tie distribution cars. A computing resource is communicatively coupled to each of the rail tie distribution car controllers. A rail tie distribution plan, comprising a plurality of drop off locations, is stored in the computing resource. The computing resource is configured to implement the rail tie distribution plan by selecting, for each of the rail tie drop off locations, one of the plurality of rail tie distribution cars in the consist from which to discharge a rail tie, and selectively operating the discharge means of the selected one of the plurality of rail tie distribution cars to discharge the rail tie at the respective rail tie drop off location.

The rail tie distribution system may include a monitoring device communicatively coupled to the computing resource and operable to detect and communicate to the computing resource an unexpected condition such as an obstacle in the drop off location. The computing resource is programmed to alter the rail tie distribution plan or decline to operate the discharge means of the selected one of the plurality of rail tie distribution cars based on the unexpected condition communicated to the computing resource. The monitoring device may be at least one imager communicatively coupled to the computing resource and operable to collect an image of each of the selected rail tie drop off locations. The computing resource programmed to decline to operate the discharge means of the selected one of the plurality of rail tie distribution cars in response to a determination of an unexpected condition at one of the selected drop off locations based upon an image of the selected drop of location collected by the imager. Alternatively, the rail tie distribution car controller is operable to control an angle of the discharge chute of the respective rail tie distribution car in response to a determination of an unexpected condition at one of the selected drop off locations to adjust the speed or angle of discharge to avoid the unexpected condition. As one example, the angle of the chute may be changed to discharge the rail tie on the opposite side of the rail tie distribution car.

BRIEF DESCRIPTION OF THE DRAWINGS

FIG. 3 is a top plan view of the rail tie distribution car as in FIG. 1 with a rear or brake end of the car oriented to the right on the page.

FIG. 4 is a cross-sectional view taken along line 4-4 of FIG. 3.

FIG. 8 is a cross-sectional view taken along line 8-8 of FIG. 7 showing rail ties supported on a floor conveyor of the rail tie distribution car.

FIG. 9 is a top plan view of a modified embodiment of the rail tie distribution car as shown in FIG. 1-5 and showing rail ties supported on the floor conveyor, the descrambler, and the dealer.

FIG. 10 is a cross-sectional view taken along line 10-10 of FIG. 9.

FIG. 16 is a top plan view showing the operations car and the consist of rail tie distribution cars, with each rail tie distribution car distributing ties on the same side of the track.

FIG. 16A is a top plan view showing a portion of a rail tie distribution car of FIG. 16 and its imagers in additional detail.

FIG. 17 is a top plan view showing certain cars in the consist of rail tie distribution cars of FIG. 16 distributing ties on one side of the track and others not distributing ties in that timeframe or distributing ties on the other side of the track.

FIG. 18 is a top plan view showing a rail tie distribution car in the consist of FIG. 16 distributing ties on the opposite side of the track relative to the other rail tie distribution cars in the consist because of the presence of a permanent obstacle.

FIG. 19 is an elevational view showing certain rail tie distribution cars in the consist of FIG. 16 distributing ties so as to account for a hill on the side of a track.

FIG. 20 is a top plan view showing a rail tie distribution car in the consist of FIG. 16 distributing ties so as to avoid an obstacle that has unexpectedly appeared on the side of the track.

DETAILED DESCRIPTION OF THE PREFERRED EMBODIMENTS

Figure 1:
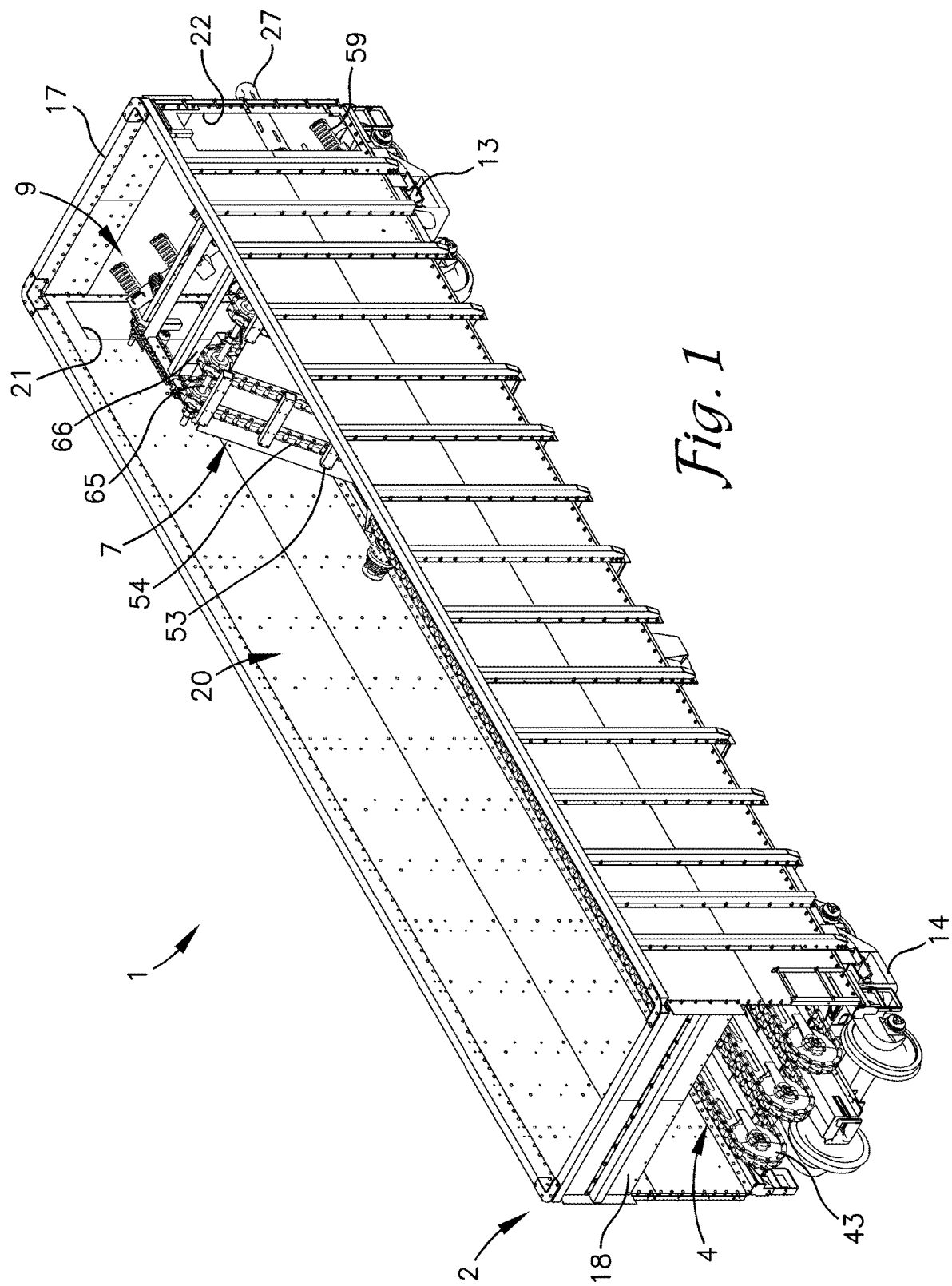
FIG. 1 is a rear perspective view of a rail tie distribution car including a live bottom conveyor, a descrambler, a dealer and a discharge chute for discharging rail ties through an opening in the sidewall of the car.

As required, a detailed description of the preferred embodiments is provided herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
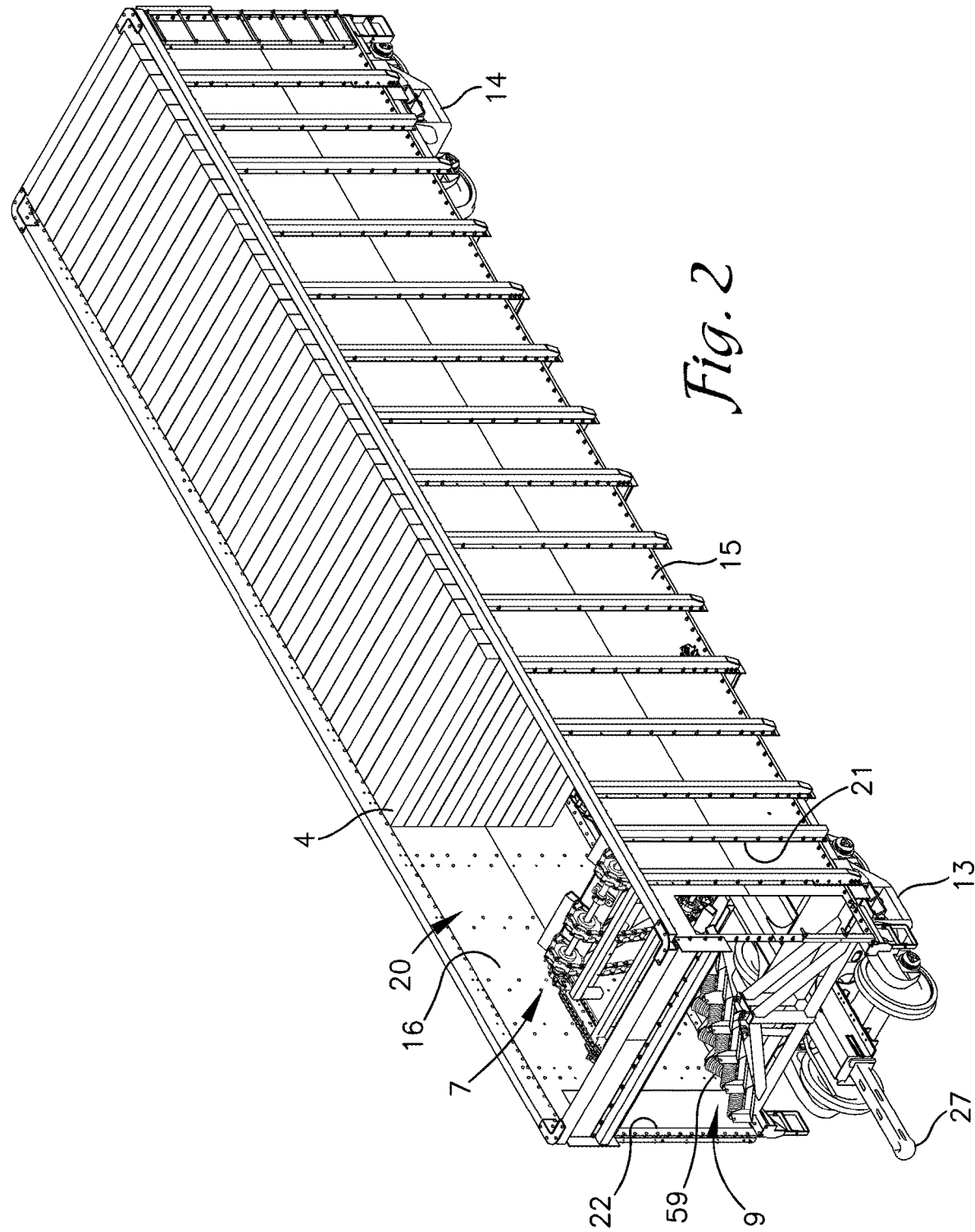
FIG. 2 is a front perspective of the rail tie distribution car as in FIG. 2 with rail ties supported on the floor conveyor.
Figure 5:
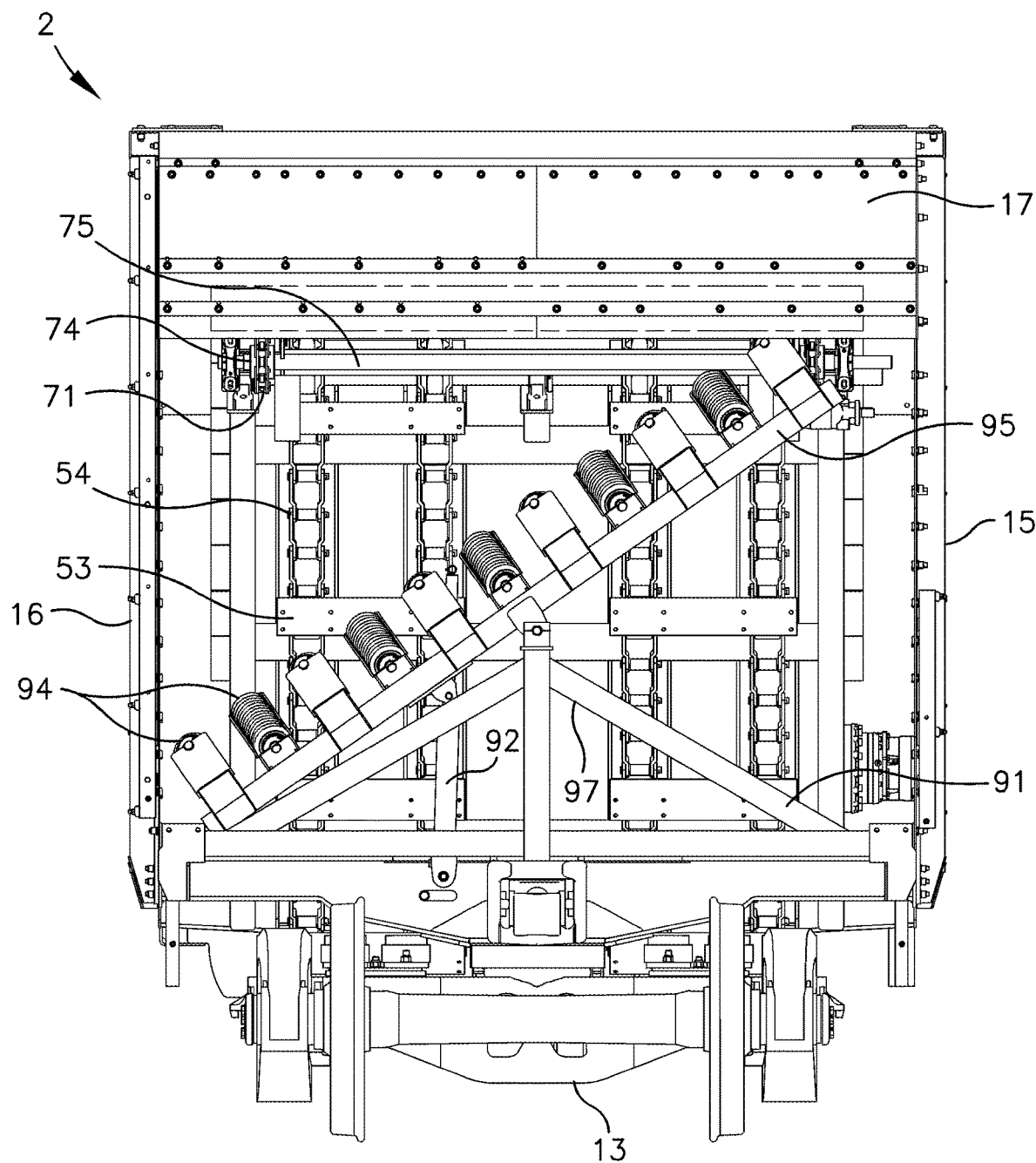
FIG. 5 is an elevational view of a front or discharge end of the rail tie distribution car.

Referring to the drawings, reference numeral 2 designates a rail tie distribution car, which may be coupled together with a plurality of similar rail tie distribution cars 1 to form a consist or pack of rail tie distribution cars 1 as part of a rail tie distribution system adapted to carry, singulate and discharge rail ties 4 at selected locations along the side of a section of track. The rail tie distribution system further includes a rail tie feeder 5, a rail tie singulating assembly 7 and a rail tie discharge assembly 9 on each car 1. In the embodiment shown in FIGS. 1-6, the rail tie distribution car 1 is built into an existing open top gondola type rail car including a frame 11 supported on first and second or front and rear trucks or bogies 13 and 14, first and second sidewalls 15 and 16 secured to the rail car frame 11 and first and second end walls 17 and 18 secured across the ends of the first and second sidewalls 15 and 16. The first and second end walls 17 and 18, which are shown fragmentary in FIGS. 1 and 2 to show interior detail, may also be described as front and rear end walls 17 and 18 with the rear end wall 18 corresponding to the end of the car 1 at which a hand operated brake control (not shown) is located. Correspondingly, the first and second sidewalls 15 and 16 may be referred to as the left and right sidewalls 15 and 16.

The first and second sidewalls 15 and 16 and first and second end walls 17 and 18 are shown as surrounding the feeder 5, singulating assembly 7 and discharge assembly 9 within an interior or enclosed space or well 20 of the rail car 1. First and second or left and right discharge openings or slots 21 and 22 are formed in the first and second sidewalls 15 and 16 laterally adjacent to the rail tie discharge assembly 9. Each slot 21 and 22 extends from proximate a lower end of the respective sidewall 15 and 16 to proximate an upper end thereof and is sized at least slightly wider than a rail tie to allow rail ties 4 to be discharged therethrough.

The frame 11 of the embodiment shown comprises a center sill 24 and floor supports or lateral frame members 25 and truck bolsters 26. The lateral frame members 25 and the truck bolsters 26 are supported on and extend transverse to the center sill 24. The truck bolsters 26 are positioned at opposite ends of the center sill 24 and are larger than the lateral frame members 25 to provide additional support for the trucks 13 and 14.

A draw bar 27 is shown secured in a first or front coupler receiver 28 connected to the front truck 13. The free end of the draw bar 27 may be secured in a second or rear coupler receiver 29 of the adjacent car 1. Conventional couplers (not shown) may be used to couple adjacent cars 1 together. It is also foreseen that adjacent cars 1 could be supported on a shared truck. A plurality of rail tie distribution cars connected together by draw bars 27 or shared trucks, which are not readily separable, may be referred to as a pack of rail tie distribution cars 1. A typical pack may comprise three to seven rail tie distribution cars 1.

The rail tie feeder 5 shown comprises a conveyor assembly 31 extending horizontally across the bottom of the enclosed space 20 of the rail tie distribution car 1 with the left and right sidewalls 15 and 16 extending on opposite sides of the conveyor assembly 31. The conveyor assembly 31 may also be referred to as a live bottom conveyor or a floor conveyor and may be described as forming the floor of rail tie distribution car 1. The conveyor assembly 31 is formed from a plurality of continuous chains 33, three in the embodiment shown, having an upper run 34 supported on chain guides 36 which are supported on a conveyor frame 37 mounted on the frame 11 of the rail tie distribution car 1. Drive sprockets 39 are mounted on a drive axle 40 supported on the conveyor frame 37 proximate a discharge end 41 of the conveyor assembly 31. Each chain 33 extends around and is engaged by a respective drive sprocket 39. A chain drive motor 42, which may be a hydraulic motor, is connected to and drives the drive axle 40 for driving the drive sprockets 39 and conveyor chains 33. Idler sprockets 43 are rotatably mounted on the conveyor frame 37 on an idler end 44 of conveyor assembly 31 opposite the discharge end 41. Each chain 33 extends around a respective idler sprocket 43. The longitudinal position of the idler sprockets 43 may be adjustable, using for example, a hydraulic actuator (not shown) to adjust the tension or slack in the conveyor chains 33. The rail ties 4 may be loaded onto the conveyor assembly 31 from the open top of the tie distribution car 1. It is foreseen that the rear end wall 18 proximate the idler end 44 of conveyor assembly 31 may be openable or removable to facilitate loading of rail ties 4 onto the conveyor assembly 31.

An angled guide plate 46 connected between the conveyor frame 37 and the rail car frame 11 slopes downward from the discharge end 41 of conveyor assembly 31 to an inlet or infeed end 47 of a tie elevating conveyor or descrambler 48 forming a portion of the singulating assembly 7. As the conveyor chains 33 are rotated so that the upper runs 34 rotate toward the singulating assembly 7, rail ties stacked on the upper runs 34 of the conveyor chains 33 fall from the chains 33 at the discharge end 41 thereof and against a lower, infeed end 47 of the descrambler 48 guided thereto by the downwardly angled guide plate 46.

Pusher dogs 53 or other tie engaging structure on a plurality of continuous and powered conveyor chains 54 of the descrambler 48 engage rail ties 4 which have tumbled to the infeed end 47 of descrambler 48 and carry or lift the rail ties 4 individually up to an outfeed conveyor 55. An indexing mechanism or gate 57 on the distal end of the outfeed conveyor 55 is operable to selectively allow advancement of rail ties 4 individually from the outfeed conveyor 55 onto a discharge chute 59 of the discharge assembly 9. The indexing mechanism 57 in combination with the outfeed conveyor 55 may be referred to as a dealer. The descrambler 48 and outfeed conveyor 55 and indexing mechanism 57 may collectively be referred to as the singulating assembly 7.

The descrambler 48 and outfeed conveyor 55 are constructed in a manner similar to floor conveyor assembly 31. The descrambler 48, in the embodiment shown, comprises four conveyor chains 54 supported on chain guides 62, which are supported on a descrambler frame 63 mounted on the rail car frame 11. Four drive sprockets 64 are mounted on a descrambler drive shaft 65 which is rotatably mounted on the descrambler frame 63 across a discharge end 66 of the descrambler 48. Four idler sprockets 67 are rotatably connected to the descrambler frame 63 at the infeed end 47 of the descrambler 48. Each descrambler conveyor chain 54 extends around a respective drive sprocket 64 and idler sprocket 67. A descrambler motor (not shown), such as a hydraulic motor, is connected to and rotatably drives the drive shaft 65, drive sprockets 64 and conveyor chains 54 for conveying rail ties upward from the infeed end 47 to the discharge end 66 of the descrambler 48.

The pusher dogs 53 shown, are formed as square tubes connected between adjacent tie elevating conveyor chains 54. Support plates 69 may also be mounted to the descrambler frame 63 between and outside of the chain guides 62 to provide additional support for rail ties 4 conveyed upward by the chains 54 and pusher dogs 53.

The outfeed conveyor 55, in the embodiment shown, comprises two conveyor chains 71 supported on chain guides 72, which are supported on a outfeed conveyor frame 73 mounted on the rail car frame 11. Two drive sprockets 74 are mounted on an outfeed conveyor drive shaft 75 which is rotatably mounted on the outfeed conveyor frame 73 across a discharge end 76 of the outfeed conveyor 55. Two idler sprockets 77 are rotatably connected to the outfeed conveyor frame 73 at an infeed end of the descrambler 48. Each outfeed conveyor chain 71 extends around a respective drive sprocket 74 and idler sprocket 77. An outfeed conveyor motor (not shown), such as a hydraulic motor, is connected to and rotatably drives the drive shaft 75, drive sprockets 74 and outfeed conveyor chains 71 for advancing rail ties 4 form the discharge end 66 of the descrambler 48 to the indexing mechanism 57 of the dealer and off of the outfeed conveyor 55 and onto the discharge chute 59 in conjunction with selective indexing of the indexing mechanism 57. It is foreseen that the rail tie feeder 5 and singulating assembly 7 will be operated to maintain a plurality of rail ties 4 on the dealer for supplying rail ties 4 to the discharge chute 59 on command and as needed.

The indexing mechanism 57 may comprise a gate (not shown) pivotally connected proximate the discharge end 76 of the outfeed conveyor 55 and pivotal into and out of the path of a rail tie 4 on the dealer 55 using an actuator connected between the gate and outfeed conveyor frame 73 to restrain the rail tie from advancing off the end of the dealer 55. The gate is pivotal into the path of a rail tie to restrain the tie and then pivotal away from the path of travel of the rail tie on the outfeed conveyor 55 to allow the rail tie to advance off the end of the dealer 55 and fall onto the discharge chute 59. It is foreseen that a wide variety of means could be utilized to selectively control the advancement of ties individually form the dealer 55 onto the chute 59.

The discharge chute 59 is pivotally mounted on the upper end of a fulcrum 91 mounted on the rail car frame 11. One or more tilting actuators 92 are connected between the base frame 11 or fulcrum 91 and the chute 59 on one side of the fulcrum 91. The discharge chute 59, fulcrum 91 and tilting actuator 92 comprise the rail tie discharge assembly 9. Retraction of the tilting actuator 92 pivots the chute 59 to slope downward toward a first or left side of the rail car 1 to allow a rail tie 4 deposited thereon from the dealer to slide off the chute 59, out the laterally aligned left opening 21 in the left sidewall 15 and out past the rail tie distribution car 1 and onto the side of a track on which the rail car 1 is traversing. Extension of the tilting actuator 92 pivots the chute 59 to slope downward toward the second or right side of the rail car 1 to allow a rail tie 4 deposited thereon from the dealer to slide off the chute 59, out the laterally aligned right opening 22 in the right sidewall 16, out past the rail tie distribution car 1 and onto the side of a track on which the rail car 1 is traversing. In the embodiment shown, the discharge assembly or tie ejector relies on gravity as the motive force for ejecting or discharging the rail ties 4 from the rail car. The angle at which the discharge chute 59 is inclined is preferably adjustable to adjust the distance away from the rail car 1 the rail tie 4 travels upon discharge. It is also foreseen that gates or other means for selectively retaining and then releasing rail ties 4 from the chute 59 may be incorporated into the chute 59. Chute 59 is formed from a plurality of rollers 94 mounted on a frame assembly 95 to form a V-shaped chute. It is foreseen that other means may be incorporated into the bottom or sides of the chute 59 for reducing friction between the ties 4 and chute 59. Similarly, it is foreseen that means for increasing the friction between the ties 4 and the chute 59 may be incorporated into the chute 59 to reduce the distance traveled by or trajectory of rail ties 4 released from the chute 59. Such friction increasing means may include forming the chute 59 or lining surfaces of the chute 59 with higher friction materials or coatings. The fulcrum 91 shown is formed from a plurality of rigid tubes 97 in the shape of a triangle.

Each open top rail tie distribution car 1 may be modified to include rails mounted to and extending along the upper end of each sidewall 15 and 16 with bridges pivotally connected to selected ends of the rails to be pivoted between adjacent rails of adjacent rail tie distribution cars 1 to span the gap therebetween and allow a modified excavator type rail tie unloader fitted with a grapple (not shown) to travel across and between each of the open top rail cars 1 in a consist 101 of rail tie distribution cars 1 (see FIG. 16). The rail tie unloader may be used to selectively move rail ties 4 if they become jammed within the well 20 of a car 1 or for other purposes. In embodiments, a tie presence sensor may be provided on the tie ejector, e.g., on the chute 59 thereof or elsewhere, to determine whether a rail tie 4 is in position to be discharged. The tie presence sensor may be an infrared sensor, a load cell, and/or another suitable sensor.

Figure 6:
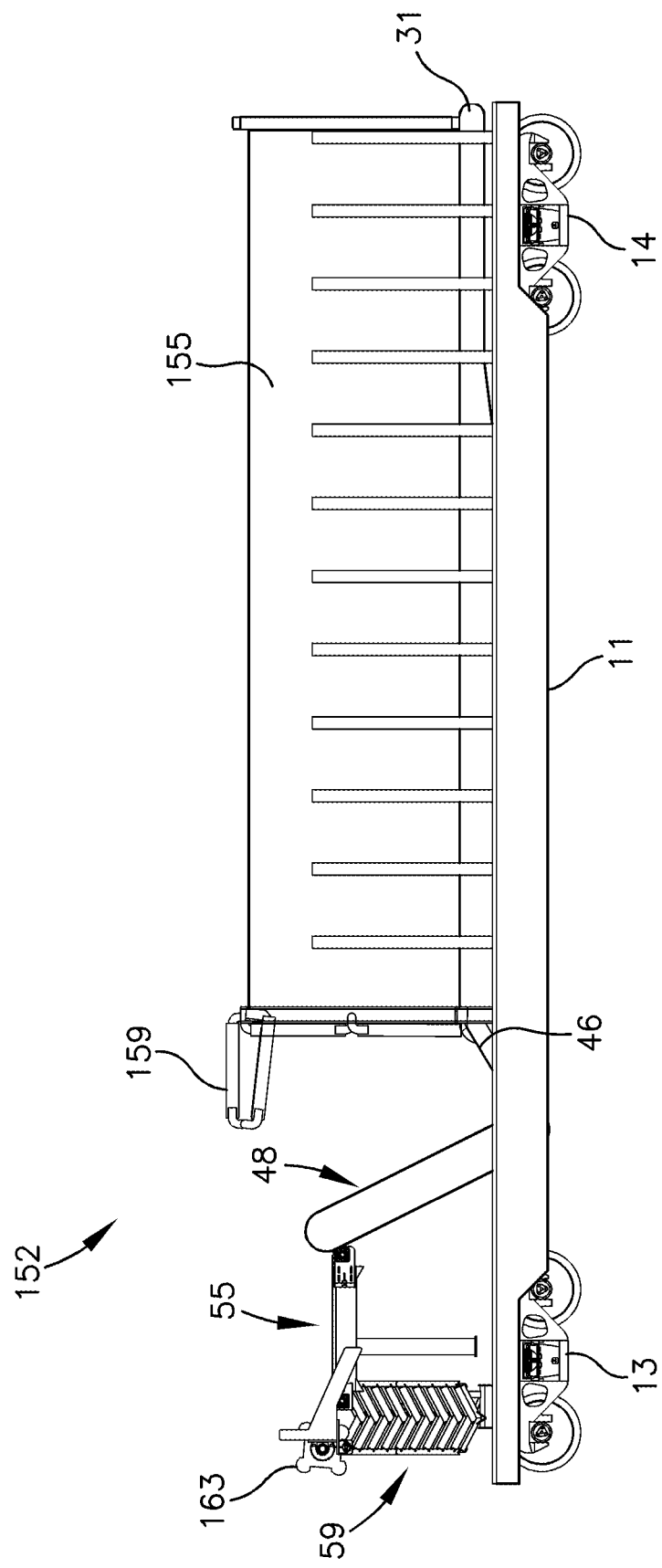
FIG. 6 is a partially schematic, left side view of a second embodiment of the rail tie distribution car.
Figure 7:
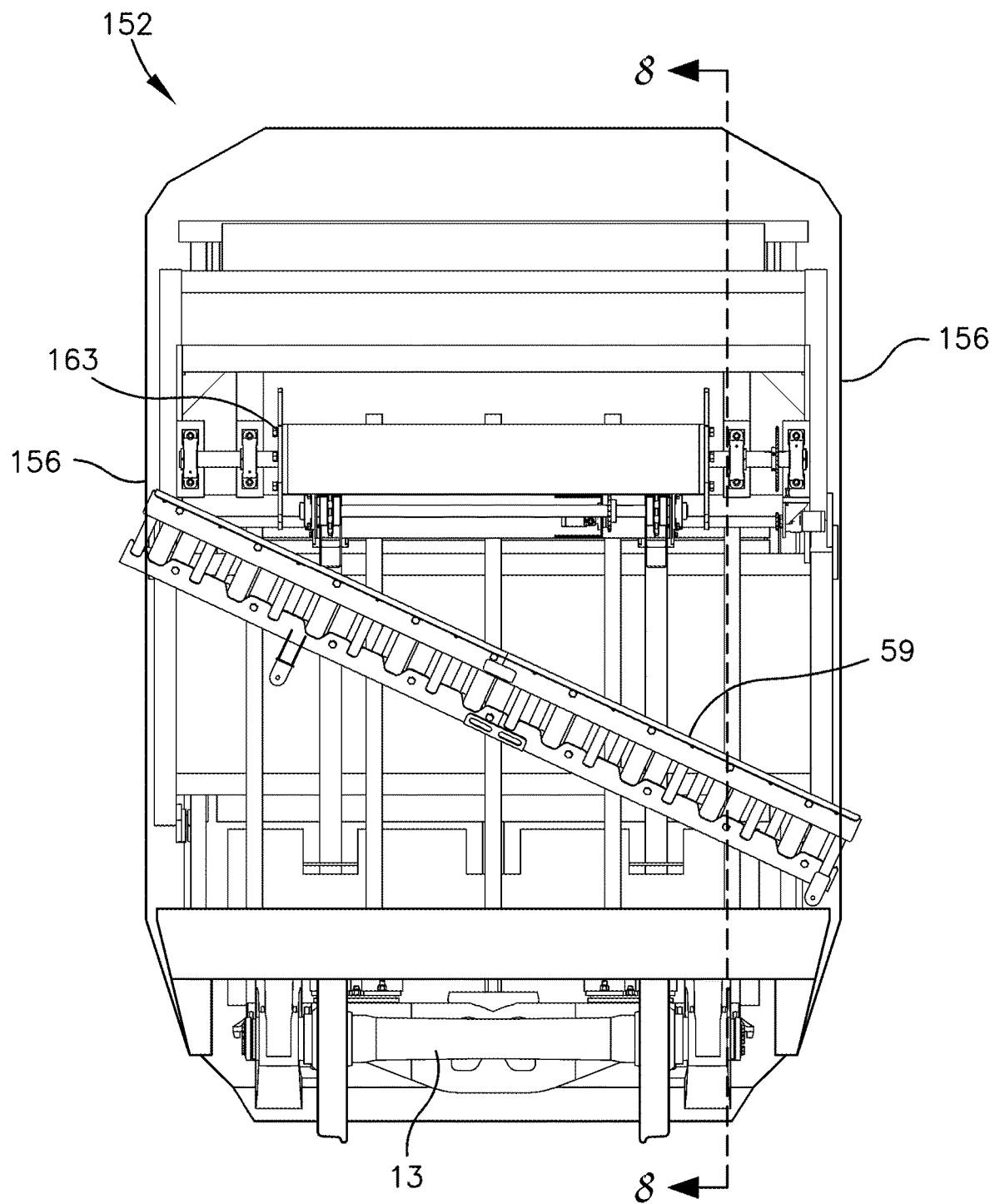
FIG. 7 is an elevational view of a front or discharge end of the rail tie distribution car as shown in FIG. 6.

An alternative embodiment of a rail tie distribution car 152 is shown, partially schematically, in FIGS. 6-8. Components of the rail tie distribution car 152 that are similar to components of the rail tie distribution car 1 of the first embodiment may be identified by the same reference number for clarity. The alternative rail tie distribution car 152 may be custom built on a rail car frame 11 supported on trucks 13 and 14. First and second sidewalls 155 and 156 only extend along the side of or laterally adjacent to the floor conveyor 31 and do not extend along the sides of the singulating and discharge assemblies 7 and 9. The open sides of the rail car 1 extending from the front end of each sidewall 155 and 156 to a front end of the rail tie distribution car 1 including adjacent the discharge assembly 9 may be described as an opening in each sidewall 155 and 156 through which a rail tie 4 may be discharged by the discharge assembly 9 out the side of respective side of the rail tie distribution car 1 and onto the side of a track.

A front wall or first end wall 159 may be retractable, as shown schematically in FIG. 6 to allow rail ties to advance from the end of the floor conveyor 31 onto the guide plate 46 and into the inlet end 47 of the descrambler conveyor 48.

A rotary indexing mechanism 163 is shown mounted on the discharge end 76 of the outfeed conveyor 55 to control advancement of rail ties 4 onto chute 59.

FIGS. 9-14 shows a rail tie distribution car 165 which is a modified version of the rail tie distribution car 1. Structure on car 165 closely corresponding to structure on car 1 are labeled with the same reference numbers. FIGS. 9 and 10 show rail ties 4 loaded on the floor conveyor assembly 31, being advanced up the descrambler conveyor 48, across outfeed conveyor 55 and to an alternative indexing mechanism 167 which is shown in more detail in FIGS. 11-14. The indexing mechanism 167 includes a plurality of rail tie stops 171 fixedly mounted on the outfeed conveyor frame 73 and a plurality of tie lift assemblies 173 (see FIGS. 12-14) connected to the outfeed conveyor frame 73. The tie lift assemblies 173 are advanceable vertically to lift a rail tie 4 held against the rail tie stops 171 upward past the stops 171 so that the rail tie 4 may then roll forward and downward on rollers 175 on the tie lift assemblies 173 and on rollers 177 mounted forward of the rail tie stops 171 so that the rail tie 4 rolls downward and forward onto the discharge chute 59.

Indexing mechanism 167 is of a known type utilized in rail tie manufacturing facilities. Each rail tie stop 171 is formed as an upwardly projecting shoulder on a stop bracket 179 fixedly mounted on the outfeed conveyor frame 73 proximate the discharge end 76 thereof. Four rail tie stop brackets 179 with rail tie stops or shoulders 171 formed thereon are mounted on the outfeed conveyor frame 73 in two sets of two with the brackets 179 of each set mounted on opposite sides of a respective outfeed conveyor chain 71 proximate the discharge end thereof. The shoulder 171 of each stop bracket 179 extends upward just past a horizontal leg 181 of the stop bracket 179. The horizontal leg 181 extends approximately flush with or just below the upper surface or path of rotation of the outfeed conveyor chains 71.

Ties 4 conveyed forward on the outfeed conveyor chains 71 toward the chute 59 are advanced over the horizontal leg 181 of each stop bracket 179 and against the shoulder or stop 171 formed on the stop bracket 179 blocking advancement of the tie 4 to the chute 59. In the embodiment shown, three rollers 177 are mounted on the stop bracket 179 forward of the shoulder or stop 171 and opposite the horizontal leg 181. The rollers 177 are mounted on each stop bracket 179 so that the top of each roller extends successively lower in the forward direction on the bracket 179 such that a rail tie 4 supported on the rollers 177 will roll forward and downward due to gravity.

Figure 12:
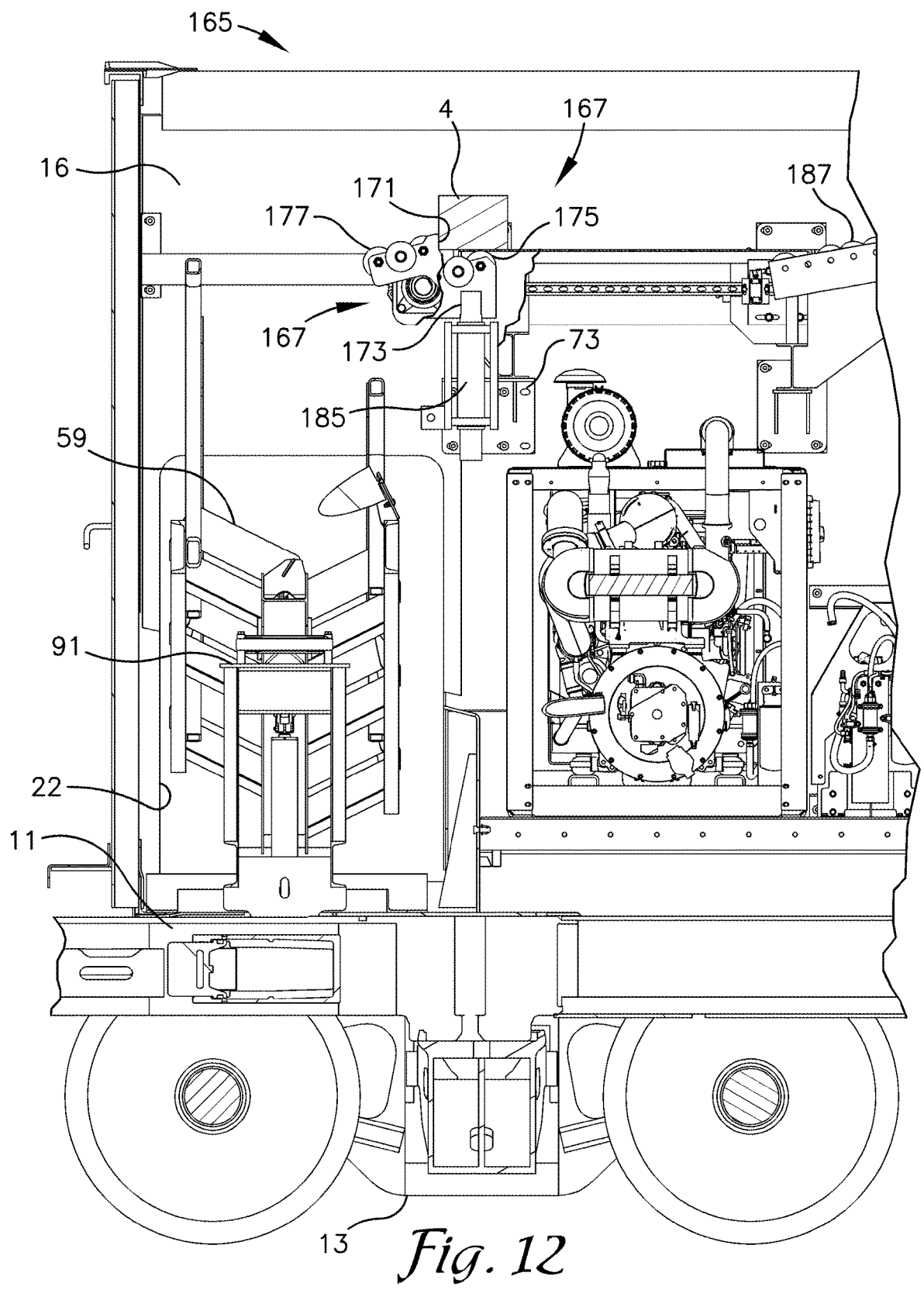
FIG. 12 is a greatly enlarged and fragmentary view of the discharge end of the rail tie distribution car as shown in FIG. 10 with portions removed to show additional detail of a tie lift assembly of the dealer in a retracted position and supporting a tie thereon.
Figure 13:
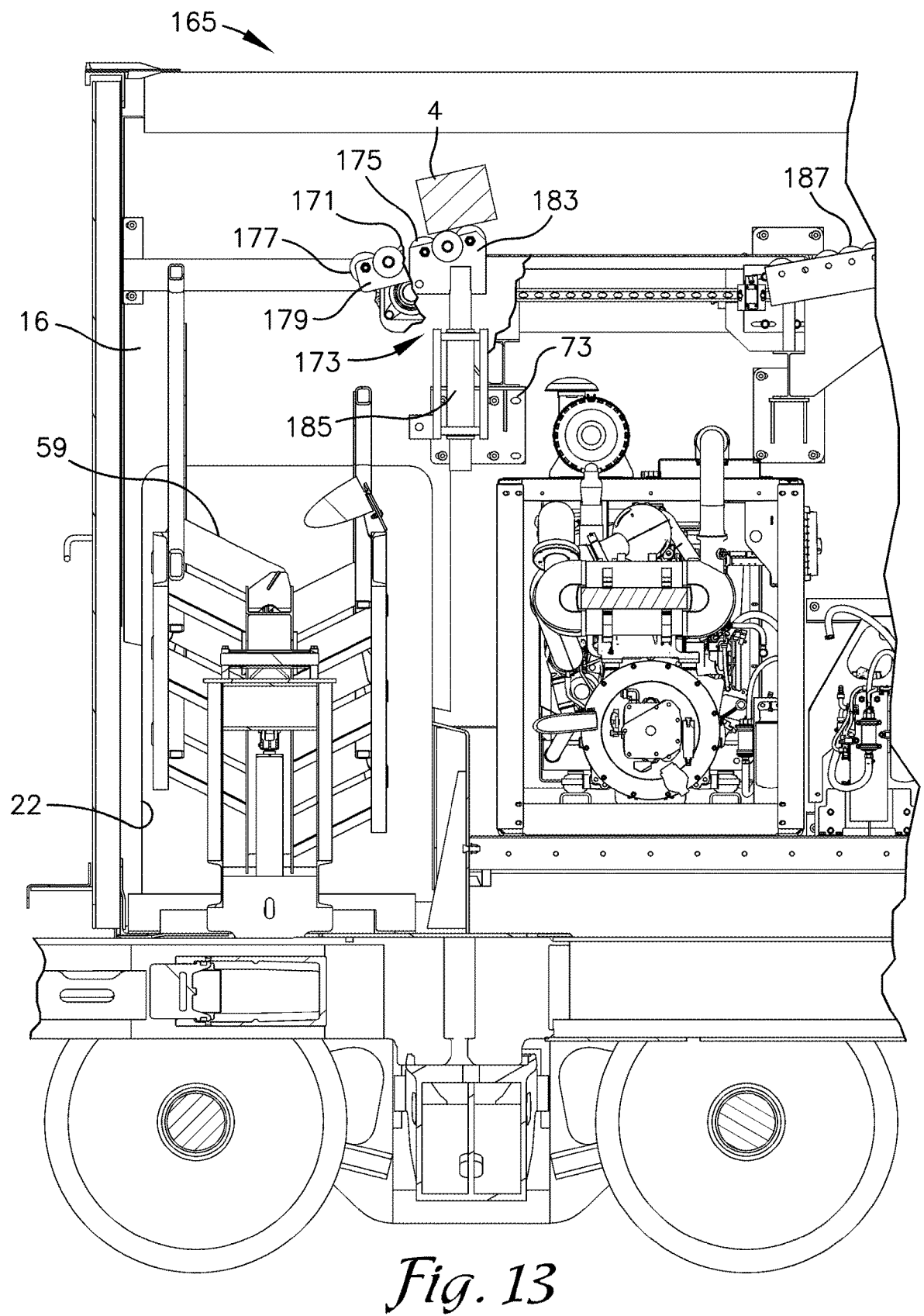
FIG. 13 is a view similar to FIG. 12 showing the tie lift assembly in an extended position with a tie supported thereon.
Figure 14:
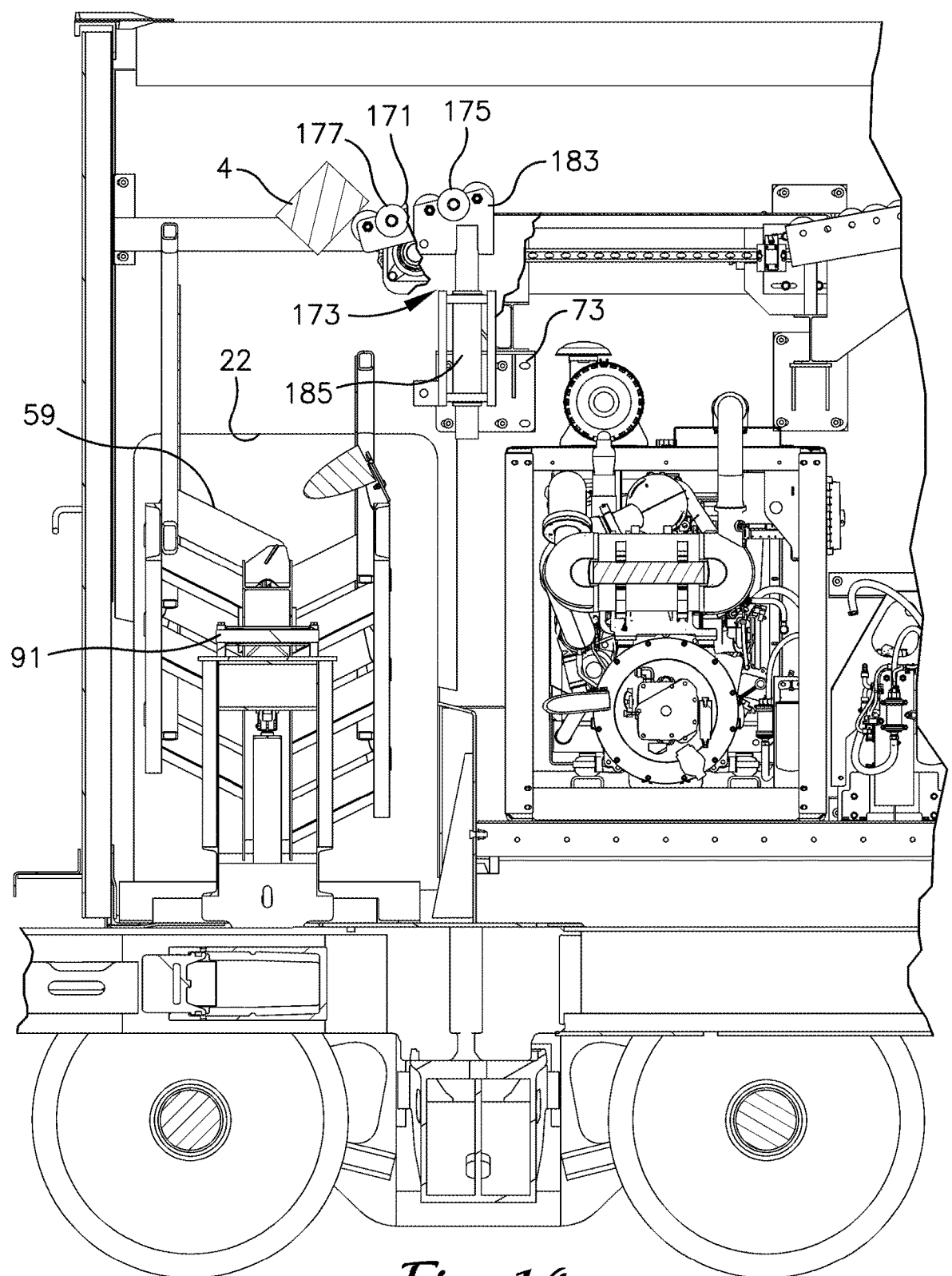
FIG. 14 is a view similar to FIG. 13 showing with shown having rolled off the tie lift assembly.

In the embodiment shown, two tie lift assemblies 173 are utilized, one between each set of two rail tie stops 171. As best seen in FIGS. 13 and 14, each tie lift assembly 173 includes three lift rollers 175 mounted on a lift roller support bracket 183 which is connected to the outfeed conveyor frame 73 by a linear actuator 185 oriented to raise or lower the lift roller support bracket 183 and attached rollers 175 relative to the stop or shoulder 171 of each stop bracket 179. The rollers 175 are mounted on each lift roller support bracket 183 so that the top of each roller extends successively lower in the forward direction on the support bracket 183 so that once a bottom surface or edge of a tie 4 supported on the lift rollers 175 is raised upward past the upper edge of the stops 171, the rail tie 4 rolls forward and downward on the lift rollers 175 (see FIG. 13), then onto the rollers 177 on stop bracket 179 and then onto the chute 59 (see FIG. 14). Once a rail tie 4 rolls off the tie lift assembly 173 and onto the rollers 177 of the stop bracket 179, the roller lift assemblies 173 are retracted to allow the next tie 4 to be advanced by outfeed conveyor 55 against the stops 171. In FIG. 12, portions of the tie lift assembly 173, including one roller 175 are broken away to show more details of stop bracket 183. Similarly in FIGS. 13 and 14, portions of the stop bracket 183 are broken away to show more details of the tie lift assembly 173.

Referring again to FIG. 11, it can be seen that three roller assemblies 187 are mounted to the outfeed conveyor frame 73 to facilitate rolling advancement of a tie 4 from the discharge end 66 of the descrambler conveyor 48 to the inlet end of the outfeed conveyor chains 71. Referring to FIG. 10, it can be seen that the idler sprockets 43 of the conveyor chains 33 forming floor conveyor 31 are spaced forward and inward from end wall 18. As can be discerned from FIG. 9, the floor conveyor 31 comprises 4 conveyor chains 33. A baffle 189 is mounted between first and second sidewalls 15 and 16 of the rail car 165 across the second end wall 18. The baffle 189 directs any ties falling thereon back to the floor conveyor 31.

A plurality of sensors in communication with a controller 250 (see FIG. 15) on the rail tie distribution car 165 are utilized to control the feeding, descrambling and discharge of rail ties 4 from the car 165. Referring to FIG. 10, upper and lower optical sensors 191 and 192 mounted on one or both sidewalls 15 and 16 of the car 165 are used to control the operation of the floor conveyor 31 to advance ties to the descrambler conveyor 48. As a stack of ties 4 is advanced off the end of the discharge end 41 of the floor conveyor 31 they fall into the trough formed by the angled guide plate 46 and the descrambler conveyor 48 and form a pile of ties (not shown). The descrambler conveyor 48 then engages ties 4 and lifts them from the pile and conveys them to the outfeed conveyor 55. If the pile of ties extends above the upper optical sensor 191, operation of the floor conveyor is stopped until the height of the pile drops below the lower optical sensor 192. Once the height of the pile drops below the height of the lower optical sensor 192, the floor conveyor 31 is operated to advance more ties 4 into the trough and until the height of the pile of ties 4 extends above the upper optical sensor 191.

Figure 11:
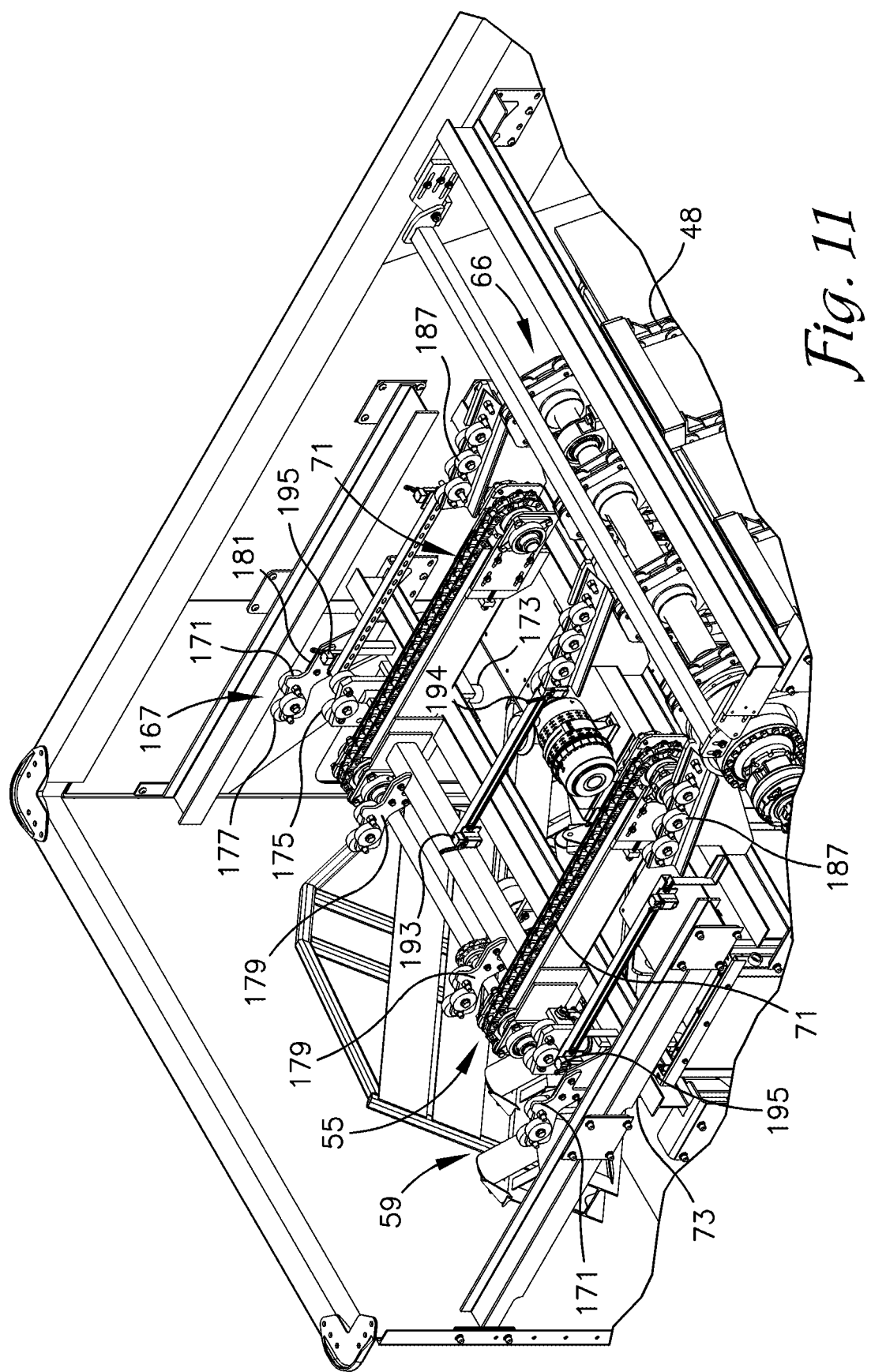
FIG. 11 is a fragmentary and enlarged perspective view of a discharge end of the rail tie distribution car as shown in FIGS. 9 and 10.

Referring to FIG. 11, first and second descrambler control sensors 193 and 194 are mounted on the outfeed conveyor frame 73. In one embodiment, the outfeed conveyor chains 71 run continuously to automatically advance any tie advanced onto the outfeed conveyor chains 71 forward against the stops 171 or other ties 4 held in position by the stops 171. The first descrambler control sensor 193 is positioned closest to the stops 171 at a distance at which a second tie 4 backed up from the stops 171 will engage the first descrambler control sensor 193. When the tie 4 held against the stops 171 is discharged, the second tie 4 will move forward against the stop and out of contact with the first descrambler control sensor 193. When the first descrambler control sensor 193 is not engaged by a tie 4, the descrambler conveyor 48 is operated to advance ties up to and onto the outfeed conveyor 55 until enough ties are backed up against the stop 171 to engage the second descrambler control sensor 194 which turns off the descrambler conveyor 48. The descrambler conveyor 48 is not operated again until the last tie 4 is advanced out of engagement with the first descrambler control sensor 193 and against the stops 171 which may be described as a ready position. A tie 4 in the ready position against the stops 171, as shown in FIG. 12, is generally available to be discharged by the indexing mechanism 167 and chute 59.

The presence of a tie 4 in the ready position is determined by ready position sensors 195, two of which are shown in FIG. 11 with each sensor 195 mounted to the outfeed conveyor frame 73 or a respective stop bracket 179. When the ready position sensors 195 are engaged by a tie 4, a signal is sent to the controller 250 indicating the presence of a tie in the ready position against the stops 171. A computing resource, such as a computer 244 on one of the cars 165 in the consist 101 communicates with the controller 250 to cause or induce the controller 250 to activate or extend the linear actuators 185 and lift the tie 4 supported on the lift assemblies 173 over the stops 171 causing the tie 4 to roll off the rollers 175 on lift assemblies 173 and stop rollers 177 on stop brackets 179 and downward onto the chute 59. The tie 4 then slides off the chute 59 and out the discharge opening 21 or 22 in sidewalls 15 and 16 toward which the chute 59 slopes. Hydraulic fluid pressure sensors (not shown) on one or more of the linear actuators or hydraulic actuators 185 are used to indicate to the computer 244 whether the actuators 185 are extended or retracted. Once the actuators 185 are fully extended and sufficient time has passed to ensure the tie 4 on the lift assemblies 173 has rolled off the lift assemblies 173, the computer may then cause the hydraulic actuators 185 for each lift assembly 173 to retract. Once the rear edge of the lift roller support bracket 183 is lowered below the tie 4 extending there-behind, the tie 4 can advance to the stops 171.

An angle sensor (not shown) is mounted on the base frame 11 or fulcrum 91 or the chute 59 to measure the angle of the chute 59 relative to the base frame 11. Computer 244 is operated to control the angle of the chute 59 relative to the base frame 11 or fulcrum 91 to adjust the trajectory of the tie 4 on the chute 59. An accelerometer (not shown) could be incorporated into the chute 59 to confirm when a tie 4 was discharged.

Each rail tie distribution car 1 (FIGS. 1-5), rail tie distribution car 152 (FIGS. 6-8) or rail tie distribution car 165 (FIGS. 9-14) may be coupled to a plurality of other rail tie distribution cars to form a consist or pack of rail tie distribution cars as part of a rail tie distribution system adapted to carry, singulate, and discharge rail ties 4 along the side of a section of track. Focus is directed now to FIG. 15, which shows an example rail tie distribution system 200 according to an embodiment of the present disclosure.

Figure 15:
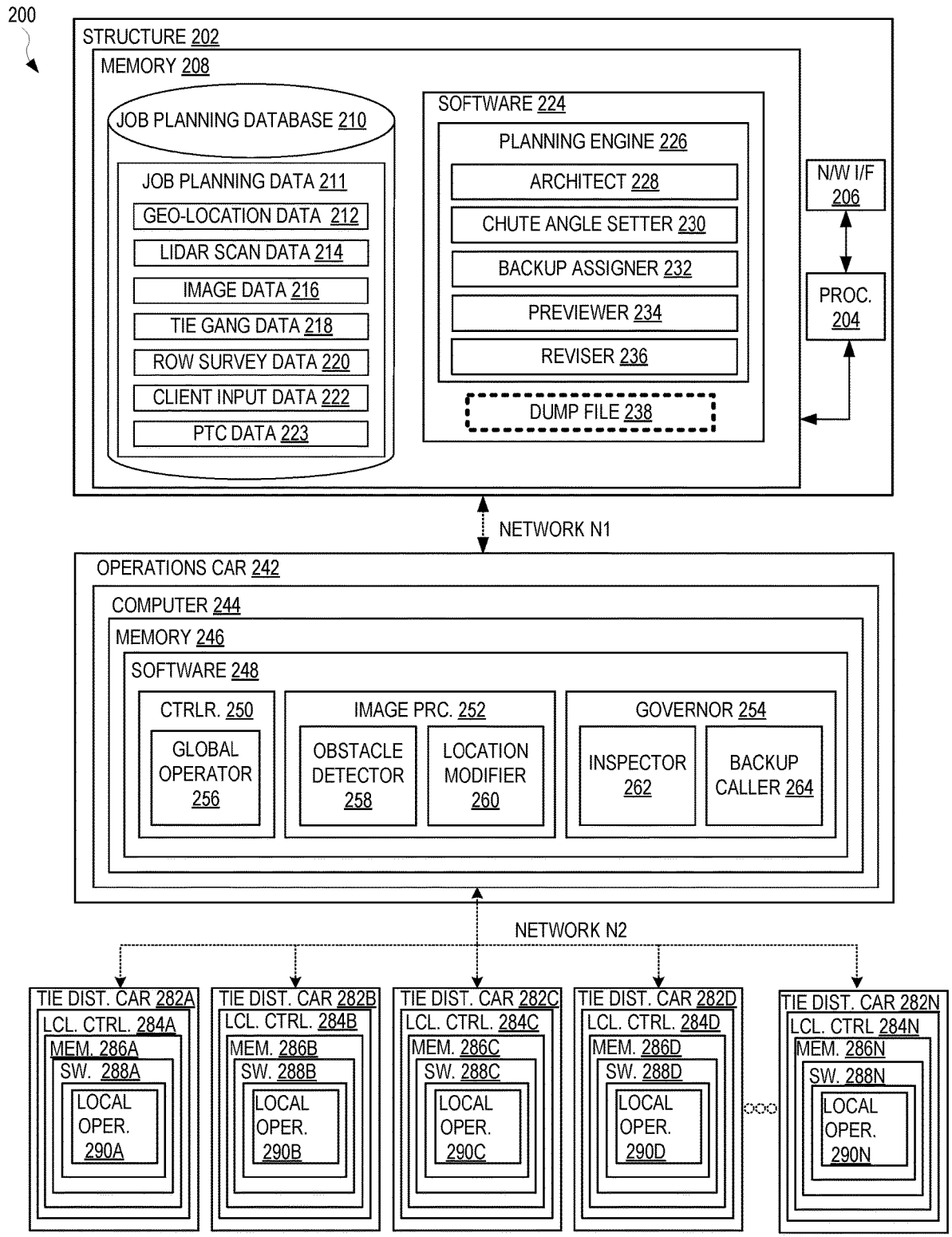
FIG. 15 is a schematic showing a rail tie distribution system having a structure, an operations car, and a consist of rail tie distribution cars.

In the embodiment shown in FIGS. 15-21, the rail tie distribution system 200 comprises a structure 202, an operations car 242, and a plurality of rail tie distribution cars 282A, 282B, 282C, 282D, and 282N. Each rail tie distribution car 282A-N may be a rail tie distribution car 1, a rail tie distribution car 152, or another suitable rail tie distribution car. While FIG. 15 shows the rail tie distribution system 200 with five rail tie distribution cars 282A-N, the artisan will understand from the disclosure herein that the rail tie distribution system 200 may include any suitable number (e.g., 2, 3, 7, 10, et cetera) of rail tie distribution cars.

The structure 202 may be usable to create a rail tie distribution plan for the distribution of rail ties 4 along the side of the track by the rail tie distribution cars 282A-N. In the embodiment shown, a computing resource, such as a computer 244 on the operations car 242, may be in data communication with the structure 202, and the structure 202 may communicate the rail tie distribution plan to the computer 244. The computer 244 on the operations car 242 may also be in data communication with each of the rail tie distribution cars 282A-N in the consist and may control the operation of these rail tie distribution cars 282A-N to implement the rail tie distribution plan communicated to the operations car 242 by the structure 202. In embodiments, and as discussed in more detail herein, when an unexpected condition occurs, e.g., the computer 244 on the operations car 242, processing imaging data collected by imagers, such as cameras 253A and 253B, detects an obstacle at a location where a tie 4 was to be discharged under the rail tie distribution plan, the computer 244 determines that the rail tie distribution machinery of a rail tie distribution car 282A-N is malfunctioning, other monitoring devices, such as LIDAR or laser scanners detect an obstacle at the location where a tie 4 was to be discharged under the rail tie distribution plan et cetera, the computer 244 may override the rail tie distribution plan and take appropriate action to facilitate the safe and effective distribution of rail ties 4 notwithstanding the unexpected condition. The structure 202, the computing resource including computer 244, and the control systems of the rail tie distribution cars 282A-N are described in turn. The unexpected condition may also be referred to herein as an override condition.

The structure 202 may be implemented by one or more networked computer servers, one or more networked computers, and/or a combination thereof. In embodiments, the operations car 242 and the rail tie distribution cars 282A-N may be collectively pushed or pulled along a section of a track by a locomotive(s) or other prime mover whereas the structure 202 may reside elsewhere (e.g., in an office building or warehouse). In other embodiments, the structure 202 may be located within the operations car 242.

The structure 202 is shown in FIG. 15 with a processor 204 communicatively coupled to a network interface 206 and a memory 208. Processor 204 represents one or more digital processors. Network interface 206 may be implemented as one or both of a wired network interface and a wireless network interface, as is known in the art. Memory 208 represents one or more of volatile memory (e.g., RAM) and non-volatile memory (e.g., ROM, FLASH, magnetic media, optical media, et cetera). Although shown within structure 202, memory 208 may be, at least in part, implemented as network storage that is external to structure 202 and accessed via network interface 206.

A transitory and/or a non-transitory portion of the memory 208 may house a job planning database 210 and a software 224. The job planning database 210 may comprise job planning data 211, gathered from one or more sources, that may be used by the software 224 to create a rail tie distribution plan to be implemented collectively by the operations car 242 and the rail tie distribution cars 282A-N.

The job planning data 211 may comprise one or more of geo-location data 212, LIDAR scan data 214, image data 216, tie gang data 218, right of way survey data 220, client input data 222, and railroad Positive Train Control data (subdivision file) 223.

In embodiments, a surveyor(s) may survey a section of a track to identify rail ties 4 in need of replacement. For example, a survey car equipped with a GPS monitor may traverse a section of the track and an operator of the survey car may employ the GPS monitor to cause the GPS coordinates of each rail tie 4 to be determined and stored. The survey car operator may further inspect the rail ties as the survey car moves along the track, and identify, by GPS coordinates, those rail ties 4 that need to be replaced. The GPS coordinates of all rail ties in the section of the track being repaired may be stored in the database 210 as geo-location data 212, together with data identifying those rail ties 4 that need replacement. Alternately, a surveyor may walk the track, collect GPS coordinates of all ties 4, and identify those ties 4 that need replacement; this data may be stored as geo-location data 212.

LIDAR scan data and image data associated with the section of the track being worked on may respectively be stored as LIDAR scan data 214 and image data 216. The LIDAR scan data 214 and image data 216 may be generated by personnel associated with the rail tie replacement process. For example, the survey car may include one or more LIDAR scanners and/or cameras that respectively collect light detection and ranging data and image data associated with the section of the track. In other embodiments, one or more of the LIDAR scan data 214 and image data 216 may be obtained in whole or in part from the railroad owner, other privately maintained sources or publicly available sources (via the world wide web using the network interface 206, for example).

Tie gang data 218, where present, may include operational preferences of the rail tie replacement crew assigned to replace the damaged rail ties 4 in the section of the track. The rail tie replacement crew may, for example, prefer that the replacement rail ties 4 be disposed on the north side (as opposed to the south side) of a track that runs east to west. Or, for instance, the rail tie replacement crew may prefer that the replacement rail ties 4 be disposed at a particular distance from the track. A person of skill in the art understands that different tie gangs may have different operational preferences. These preferences may be stored in the job planning database 210 as tie gang data 218 so that they may be considered by the software 224 during the generation of the rail tie distribution plan.

The right of way survey data 220 may include data generated by personnel associated with the rail tie replacement process and/or may comprise publicly available right of way survey data or right of way survey data obtained or provided from the railroad owner or other privately maintained sources. The software 224 may use this right of way survey data 220 to avoid encroachment or trespass of property during the rail tie distribution and replacement process.

Client input data 222 may house input from client (e.g., a railroad company). For instance, client may require that a particular number of ties 4 be replaced, that the ties 4 be distributed at a particular distance away from the track, et cetera. This input may be received before the rail tie distribution plan is generated and/or the client may provide this input upon review of a preliminary draft of the rail tie distribution plan. The software 224 may take the client input data 222 into account in creating and/or revising a rail tie distribution plan (e.g., if the client requires rail ties 4 to be deposited at a particular location, the software 224 may ensure that the rail tie distribution plan accounts for this requirement).

Turning now to the software 224, a planning engine 226 may be housed therein or otherwise associated therewith. In embodiments, the planning engine 226 may comprise a graphical user interface to allow rail tie distribution personnel to interact with the planning engine 226 using conventional means (e.g., a keyboard, mouse, voice commands, et cetera). The planning engine 226 may be stored in a transitory or non-transitory portion of memory 208 and includes machine readable instructions that are executed by processor 204 to create or assist in the creation of a rail tie distribution plan based on the data 211 in the job planning database 210. The planning engine 226 may store the generated rail tie distribution plan in a computer readable file referred to herein as a "dump file." As discussed, the dump file, e.g., dump file 238, may be communicated by the planning engine 226 to the operations car 242 so that the rail tie distribution plan may collectively be implemented by the operations car 242 and the rail tie distribution cars 282A-N as desired.

In an embodiment, the planning engine 226 may comprise an architect 228, a chute angle setter 230, a backup assigner 232, a previewer 234, and a reviser 236.

The architect 228 may determine: (a) the total number of rail ties 4 that will need to be distributed to complete the job; (b) the rail tie drop off locations and the number of rail ties 4 to be dropped off at each location; and (c) which rail tie distribution car 282A-N is to distribute rail ties 4 at which location.

The architect 228 may determine the total number of rail ties 4 to be distributed along the side of the section of the track in one or more of many ways. For example, where the geo-location data 212 identifies the GPS coordinates of each defective rail tie 4, the architect 228 may query the geo-location data 212 to determine the total number of rail ties 4 in need of replacement. In embodiments, the architect 228 may determine that the total number of ties to be distributed along the track exceeds the number of defective ties 4 by some percentage (e.g., 1%, 5% et cetera); such may ensure that any additional ties that the tie gang subsequently determines are defective are also able to be efficiently replaced. In other embodiments, the architect 228 may be configured to set the total number of ties 4 to be distributed along the section of the track to equal the number of ties that have been determined to be defective.

In some embodiments, the architect 228 may determine the total number of ties 4 in need of replacement by evaluating data 211 other than the geo-location data 212. For example, the architect 228 may determine the total number of ties 4 to be distributed along the section of the track by processing image data 216, using, e.g., feature matching techniques to identify those ties 4 that are in need of replacement. Or, for instance, the architect 228 may set the total number of ties 4 to be distributed along the track based on client input data 222.

Once the total number of ties 4 to be distributed along the section of the track is fixed, the architect 228 may evaluate the job planning data 211 to determine the drop off locations of the rail ties 4 and the number of rail ties 4 that are to be distributed at each drop off location. A person of skill in the art will understand that there may be several rail tie drop off locations along the section of the track in question and that the number of ties 4 dropped off at each location need not be the same. In some embodiments, a rail tie distribution car may be configured to deliver only a solitary rail tie at each location; in these embodiments, multiple ties may be delivered at the same location by employing multiple tie distribution cars, each of which distribute one tie at the location.

It may be preferable to drop off each new rail tie 4 proximate the defective rail tie the new rail tie 4 replaces. Therefore, where feasible, the architect 228 may set tie drop off locations proximate the defective ties being replaced.

The architect 228 may consider one or more data points in determining the tie drop off locations. For example, the architect 228 may consider the right of way survey data 220 and determine that all rail ties 4 are to be distributed on a certain side of the track in view of right of way concerns. Or, for instance, the architect 228 may factor in the tie gang data 218, and based on the preferences of the tie gang, determine that all rail ties are to be distributed on a particular side of the track where feasible. As another example, the architect 228 may evaluate the LIDAR scan data 214 and distribute rail ties 4 on one side of the track where the other side of the track has a large ditch. In making these determinations, the architect 228 may attribute different weights to different types of data. For example, if the tie gang data 218 indicates that the tie gang prefers for the ties 4 to be distributed on the north side of the track, but the image data 216 shows that the north side of the track has a large obstacle, the dump file 238 generated by the planning engine 226 may be configured to cause the rail ties 4 to be dropped off at the south side of the track notwithstanding the tie gang data 218. The architect 228 may likewise determine the number of rail ties 4 to be distributed at each drop off location by considering the number of defective rail ties proximate that drop off location.

Using a consist of rail tie distribution cars 282A-N, as opposed to a solitary tie distribution car, may provide several advantages. Consider, for example, that a solitary rail tie distribution car (e.g., car 282A) is employed to distribute rail ties 4 and that it traverses the track at 7.33 feet per second. Consider further that a tie 4 is to be distributed every 10 feet and that the rail tie discharge assembly 9 of this solitary car takes 1.5 seconds between two successive rail tie dumps (i.e., it takes 1.5 seconds for the rail tie discharge assembly 9 to collect and dispense the next rail tie 4). In this example, because of the speed of the solitary rail tie distribution car on the track and the time it takes for the rail tie discharge assembly thereof to reset, it may not be possible to distribute a tie 4 every 10 feet as required. Using a consist of rail tie distribution cars, each of which may be configured to selectively distribute rail ties on command, may allow for this problem to be addressed.

The ability to cause the rail tie distribution cars to distribute ties selectively (as opposed to all at the same time or always one after another, for example) may provide increased flexibility. For instance, where it is known that a particular rail tie distribution car will be unable to deliver ties to a particular location (e.g., because the rail tie discharge assembly 9 thereof has not yet reset after making the previous delivery), a different rail tie distribution car may be assigned to that location. In view of these benefits, the architect 228 may determine when each rail tie distribution car 282A-N is to distribute rail ties 4 by assigning at least one rail tie distribution car 282A-N to each drop off location. Care may be taken to ensure the tie distribution car assigned to a particular location will be (or will have a high likelihood of being) available to discharge ties to that location. Of course, the rail tie distribution cars 282A-282N in the consist are capable of distributing rail ties concurrently (i.e., each rail tile distribution car 282A-282N may distribute a rail tie at or about the same time as the other cars), sequentially (e.g., rail tie distribution car 282A, 282B, 282C, 282D, and 282N may distribute rail ties one after another), or in any order, in line with the requirements of a particular application.

FIGS. 16-20 illustrate example operation of the rail tie distribution system 200. Specifically, each of FIGS. 16-20 show the operations car 242 together with the consist of rail tie distribution cars 282A-N traversing a section of a track 290. As discussed herein, the operations car 242 may control and oversee the operation of the rail tie distribution cars 282A-N. In the FIG. 16 example, the architect 228 is shown to have set the rail tie distribution plan such that each rail tie distribution car 282A-N is simultaneously distributing rail ties 4 on the same side of the track 290. Conversely, in the FIG. 17 example, the architect 228 is shown to have set the rail tie distribution plan such that rail tie distribution cars 282A and 282D are distributing ties 4 on one side of the track 290, rail tie distribution car 282C is distributing ties 4 on the other side of the track 290, and the rail tie distribution cars 282B and 282E are not distributing any ties in that timeframe. In the FIG. 18 example, the architect 228 is shown to have set the rail tie distribution plan such that the ties 4 are preferably distributed on the left side of the track (e.g., here, the tie gang data 218 may indicate that it is preferable to distribute ties 4 on the left side of the track). Thus, as shown, each of rail tie distribution cars 282B, 282C, 282D, and 282N in FIG. 18 is distributing ties 4 on the left side of the track 290. However, in this example, the architect 228 has also determined based on the image data 216 that a maintenance building 229 (or other permanent structure) is present on the left side of the track; as such, the rail tie distribution car 282A is shown to be distributing ties 4 on the right side of the track 290 so that the ties 4 do not collide with the maintenance building 229. Thus, as will be understood, the rail tie distribution plan/dump file 238 generated by the architect 228 may cause the ties 4 to be distributed in any number of ways based on the specifics of the job at hand.

The chute angle setter 230 may selectively set the angle of the discharge chute 59 of each rail tie distribution car 282A-N for the distribution of rail ties 4. As noted, adjusting the angle of the discharge chute 59 may alter the discharge trajectory of the ties 4 and may determine the distance away from the rail tie distribution car the rail ties 4 travel upon discharge. The chute angle setter 230 may set the angle of the discharge chute 59 at discharge based on: (a) the lateral distance between the designated tie drop off location and the track 290; and (b) the type of terrain the ties 4 will encounter as they travel to and come to rest at the designated drop off location. For example, the downward slope of the chute 59 may be increased where the designated drop off location is close to the track 290, whereas the downward slope of the chute 59 may be decreased where the designated drop off location is further away from the track. Similarly, the chute angle may be changed to account for an uphill or downhill slope of the ground surface to be encountered by the ties 4 at or enroute to the drop off location. In this way, the chute angle setter 230 may selectively control the speed of discharge of the ties 4 to ensure the ties 4 are distributed at the designated drop off locations.

FIG. 19 shows that the ground adjacent rail cars 282C-282N is flat but that a hill 231 is present adjacent rail tie cars 282A and 282B. Each of the tie distribution cars 282A-N may distribute ties 4 such that the lateral distance between the ties 4 and the track 290 is generally the same, notwithstanding the hill 231. Such may be effectuated via the chute angle setter 230. Specifically, the chute angle setter 230, in view of the hill 231, may set a different chute angle for the chutes 59 of tie distribution cars 282A and 282B relative to the chute angle of the chutes 59 of tie distribution cars 282C-282N, to thereby cause all the ties 4 being distributed by tie distribution cars 282A-N to be dropped off at about the same distance from the track 290.

The backup assigner 232 may assign a backup car to each drop off location. As noted, the architect 228 may assign a rail tie distribution car, i.e., one of cars 282A-N, to each drop off location. The tie distribution car assigned to a drop off location by the architect 228 may also be referred to herein as the "primary assignee." From time to time, the primary assignee may be unable to distribute a tie 4 to an assigned location. Such may occur, e.g., where the tie distribution machinery of the primary assignee becomes inoperable (because of a jam in a conveyor, a breakage of the drive shaft, et cetera) or starts to operate outside its normal operating parameters. Or, for instance, the primary assignee may be unable to distribute a tie 4 to the assigned location where its supply of ties 4 is exhausted.

To account for a situation where the primary assignee is unable to distribute a tie 4 to an assigned drop off location, the backup assigner 232 may assign a backup car to each drop off location. For example, rail tie distribution car 282A may be primarily responsible for distributing a rail tie at a given location, and rail tie distribution car 282N may be assigned as the backup. In embodiments, the tie presence sensor associated with the tie ejector as discussed above may be queried (e.g., periodically, before every drop, et cetera) to determine whether the primary assignee will fail (or has failed) to distribute a tie 4 to an assigned location, and if so, the backup car may assigned as the new primary assignee. The backup assigner 232 may ensure that the backup car assigned to a given location will be (or will have a high likelihood of being) available to step in based upon a failure determination of the original primary assignee. In certain applications, one or more of the cars in the consist (e.g., car 282N) may be selected as a dedicated backup car(s).

The previewer 234 may allow for the rail tie distribution plan to be previewed. The previewer 234, when called, may display satellite imagery or the like of the track section being repaired and indicate, with icons and/or images, the locations where the rail ties 4 will be distributed and the number thereof. The previewer 234, akin to the print preview module in a word processing software, may thus give the user a high-level visual overview of the project.

The reviser 236 may allow a user to revise the rail tie distribution plan manually (e.g., in response to previewing the job via the previewer 234, because of a change in job specifications, in response to client input, et cetera). For example, the user may be able to employ the reviser 236 to change a drop off location, alter a designated backup car, cause additional or fewer ties to be distributed, et cetera.

The planning engine 226 may thus employ the data 211 and create or facilitate in the creation and streamlining of a rail tie distribution plan. Once the rail tie distribution plan is finalized, it may be saved as the dump file 238 and communicated to the operations car 242 over a network N1. Network N1 may be a wired network, a wireless network, a public network, a private network, and/or any other suitable network. While FIG. 15 shows the structure 202 is in data communication with one operations car 242, the artisan will understand from the disclosure herein that the structure 202 may likewise be in communication with a plurality of operation cars 242 in different parts of the world over the same network N1 or different networks and that each operations car 242 may in-turn be in data communication with any number of rail tie distribution cars. Thus, the structure 202 may be usable to generate the rail tie distribution plans or dump files for a plurality of rail tie replacement projects.

The operations car 242 may be co-located with the rail tie distribution cars 282A-N during the tie distribution process and traverses the track with the rail tie distribution cars (see FIG. 16). The operations car 242 may communicate with each of the rail tie distribution cars 282A-N over network N2, which, like network N1, may be a wired network, a wireless network, or any other suitable network or combination of networks. In embodiments, the control functionality of the operations car 242 may be incorporated in a rail tie distribution car (e.g., rail tie distribution car 282A).

Power for operating the motors for the live bottom conveyor 31, the descrambler conveyor 48, the outfeed conveyor 55, and for the actuator for the indexing mechanism 167 controlling advancement of individual rail ties 4 onto the chute 59 and tilting actuator 92 for chute 59 for each tie distribution car 282A-N may be provided by a power unit (not shown), which may be mounted on the operations car 242 or another car. The power unit may include, for example, a diesel engine and electric generator powering electric motors and hydraulic pumps for supplying pressurized hydraulic fluid from a tank or reservoir to the hydraulic conveyor motors and the actuators for the dealer gate or indexing mechanism and the chute tilting actuator 92. It is also foreseen that the power unit could be a diesel engine and electric generator for powering electric motors associated with each conveyor and powering an electrically driven actuator for tilting the chute 59.

Turning back to FIG. 15, the operations car 242 may have a computer 244 having memory 246 that houses a software 248. While not expressly shown, the computer 244 has a processor and a network interface as discussed with respect to the structure 202. The software 248 includes machine readable instructions that are executed by the processor of computer 244 to implement the dump file 238 and/or override the rail tie distribution plan if needed.

In an embodiment, the software 248 includes a controller 250, an image processor 252, and a governor 254. The controller 250 may also be referred to herein as the consist controller 250.

The controller 250 may comprise a global operator 256. The global operator 256 may be configured to globally control the high-level operation of the rail tie distribution mechanism of the rail tie distribution cars 282A-N in view of the dump file 238. In an embodiment, the global operator 256 may be able to control the power being supplied to each of the rail tie distribution cars 282A-N. Further, the global operator 256 may communicate with the rail tie distribution cars 282A-N, specifically with the controllers thereof as discussed below, to trigger each tie drop by each of the rail tie distribution cars 282A-N in accordance with the dump file 238 and to adjust the chute angle of the chutes 59 as needed. The global operator 256 may include a graphical user interface that may allow an operator to manually take charge of one or more of the rail tie distribution cars 282A-N.

The image processor 252 may comprise an obstacle detector 258 and an adaptive location modifier 260. At least one of the tie distribution cars 282A-N and/or the operations car 242 may include one or more cameras, such as a CCD camera, a CMOS camera, or other still or video camera. The cameras may be fixed or mobile and may be configured to image the side of the track 290 being traversed by the consist. In embodiments, a camera may be provided on each side of the operations car 242 and/or a tie distribution car 282A-N, so that all tie drop off locations on either side of the track 290 may be monitored. For example, FIG. 16 shows that each of the rail tie distribution cars 282A-N has two cameras or imagers 253A and 253B, one disposed on either side of the tie distribution car.

The camera 253A may, e.g., image the left side of the track 290 and the camera 253B may image the right side of the track 290. Each camera 253A, 253B may be oriented such that a drop off location is imaged some time (e.g., 5 seconds, 10 seconds, 15 seconds, et cetera) before the tie(s) are to be dropped off at that location.

The obstacle detector 258 may process the images and/or video from the cameras 253A and 253B to determine, in real time, the presence of an unexpected obstacle. Permanent obstacles, such as the maintenance building 229 in FIG. 18, may be accounted for and avoided by the architect 228 in the dump file 238. But, from time to time, an obstacle that was not present during the planning stages (i.e., during the creation of the dump file 238) may unexpectedly appear at or about a tie drop off location at the execution stage when the rail tie distribution cars 282A-N are distributing rail ties at these locations. In such case, where the obstacle detector 258 detects an obstacle at or about a tie drop off location such that the ties 4 are likely to collide with the obstacle under the rail tie distribution plan, the obstacle detector 258 may call the location modifier 260. The location modifier 260 may, in real time, process additional image data from the imagers 253A and 253B if required and adaptively modify the rail tie distribution plan/dump file 238 such that the ties 4 may be distributed proximate the original drop off location without colliding with the obstacle. For example, the location modifier 260 may cause a rail tie distribution car to distribute ties 4 after that rail tie distribution car has passed the obstacle, cause that car to distribute ties 4 on the other side of the track 290 to avoid the obstacle if feasible, et cetera. In this way, the obstacle may be avoided and the ties 4 may continue to be efficiently and safely distributed.

FIG. 20 shows an example of the image processor 252 adaptively modifying the rail tie distribution plan/dump file 238 in view of an obstacle (a vehicle 259 in this example) detected by the imager 253A and the obstacle detector 258. In this example, the vehicle 259 is adjacent rail tie distribution car 282A, and the rail tie distribution car 282A is shown to have delayed its tie dischargement relative to the other cars 282B, 282C, 282D, and 282N to avoid the obstacle 259. In this way, the operations car 242 may modify the rail tie distribution plan in real time so that the obstacle 259, with which the ties 4 would have otherwise collided, is avoided. While a vehicle is shown in FIG. 20 as the obstacle, the artisan will understand the obstacle may be any other obstacle, such as an animal or person walking along the section of the track 290, a pile of ballast rock that has just been deposited on the side of the track 290, et cetera.

The governor 254 may have an inspector 262 and a backup caller 264. The inspector 262 may monitor the distribution of ties 4 by the rail tie distribution cars 282A-N. For example, each rail tie distribution car 282A-N may have a GPS sensor, and the inspector 262 may monitor this GPS sensor and the tie presence sensor of each rail tie distribution car to ensure that rail ties 4 are being appropriately discharged. If the inspector 262 issues a warning based upon a determination that a primary assignee is unable to distribute ties to an assigned location, e.g., because the tie presence sensor of the primary assignee indicates a tie 4 is not ready for tie ejection when required, the inspector 262 may invoke the backup caller 264. The backup caller 264 may assign the backup car as the new primary assignee so that the tie(s) 4 may be distributed at the drop off location as desired.

In this way, the operations car 242 may implement or assist in the implementation of the rail tie distribution plan/dump file 238, and if an unexpected condition occurs, adaptively modify the rail tie distribution plan (e.g., alter a tie drop off location in view of an obstacle, call a backup car due to a machinery jam in the primary assignee, et cetera) so that the ties 4 may continue to be efficiently and safely distributed.

Focus is directed now to the control systems of the tie distribution cars 282A-N themselves. Rail tie distribution car 282A may include a local controller 284A, a memory 286A, a software 288A, and a local operator 290A. Rail tie distribution cars 282B-N may likewise include a controller 284B-N, a memory 286B-N, a software 288B-N, and a local operator 290B-N, respectively. The local operator 290A-N may respectively control, at a low level, the tie discharge mechanism of the associated tie distribution cars 282A-N, and in conjunction with operations car 242, implement the rail tie distribution plan/dump file 238. For example, the local operator 290A-N may control the live bottom conveyor 31, the descrambler conveyor 48, outfeed conveyor 55, tiling actuator 92 of the cars 282A-N, et cetera, in line with the directives of the operations car 242. Or, for instance, the local operator 290A-N may obtain the results of the tie presence sensor detections and communicate same to the operations car 242. The local operators 290A-290N may likewise monitor the hydraulic oil, check for machinery stalls, and perform other such actions to ensure efficient operation of the rail tie distribution cars 282A-N. The artisan will understand that the operations car 242 may interact with and control the tie distribution mechanism of the tie distribution cars 282A-N via its communications with the local controllers 284A-284N.

Figure 21:
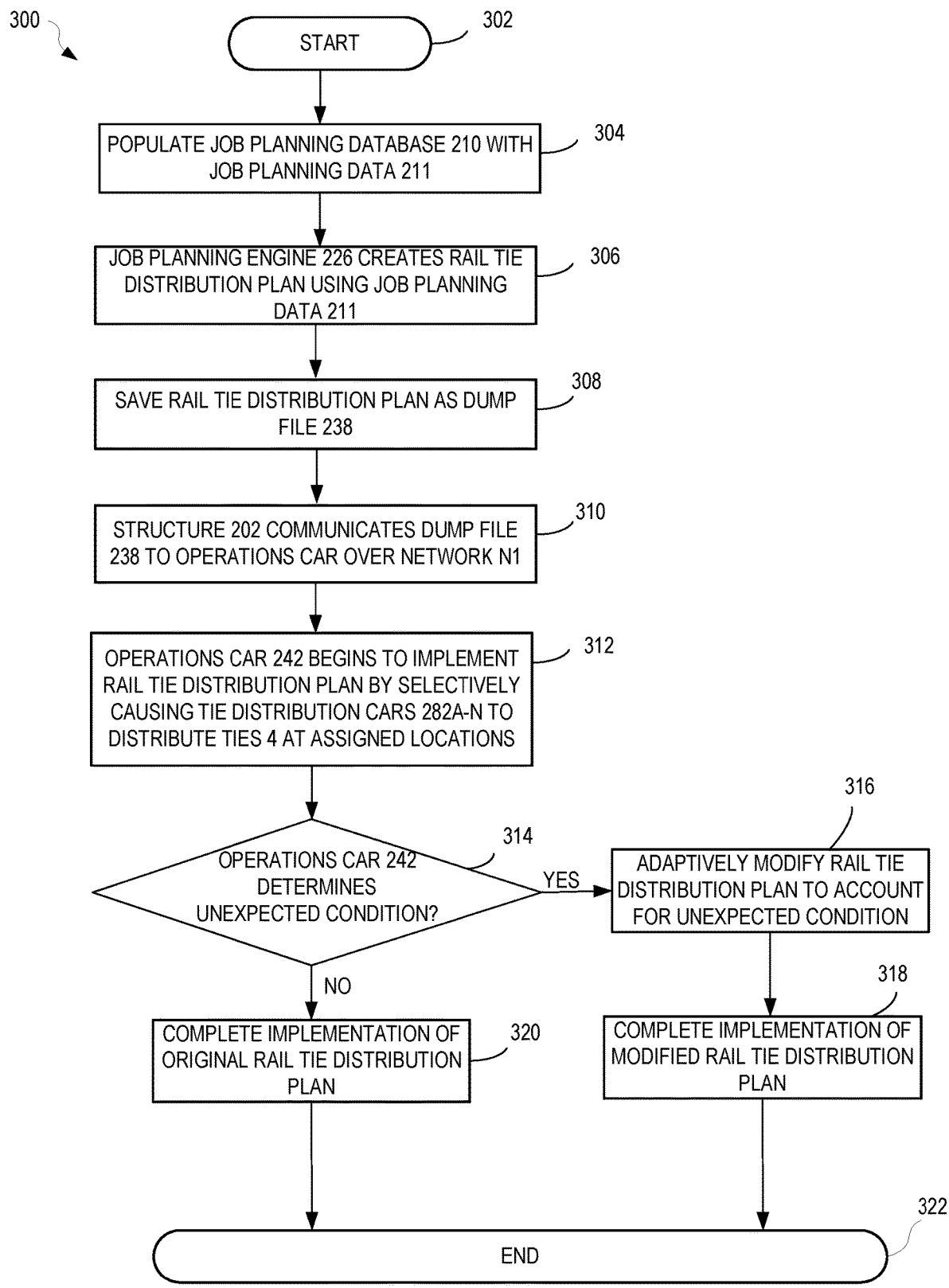
FIG. 21 is a flowchart illustrating a method of using the rail tie distribution system of FIG. 15 to distribute rail ties along a side of a track.

FIG. 21 is a flowchart illustrating a method 300 of using the rail tie distribution system 200 to distributes ties 4 to a section of the track 290.

The method 300 may begin at step 302. At step 304, job planning data 211 in the job planning database 210 may be populated. For example, a survey car with a GPS and a camera may be used to gather geo-location data 212 and image data 216, respectively, and LIDAR scan data 214 may be collected from a public source.

Next, at step 306, the software 224, and specifically the planning engine 226 thereof, may create a rail tie distribution plan using some or all of the job planning data 211. At step 308, the rail tie distribution plan may be saved as a dump file 238. At step 310, the dump file 238 may be communicated by the structure 202 to the operations car 242 over the network N1.

At step 312, the operations car 242 may begin to implement the dump file 238 by selectively causing tie distribution cars 282A-N to distribute rail ties 4 at assigned locations. If an unexpected condition is determined to occur at step 314 by the operations car 242, at step 316 the software 248 of the operations car 242 may adaptively modify the rail tie distribution plan to account for the unexpected condition, and at step 318, the implementation of the modified rail tie distribution plan may be completed. Alternately, if no unexpected condition is determined at step 314, the operations car 242 and tie distribution cars 282A-N may complete implementation of the original rail tie distribution plan at step 320. The method may end at step 322 after the rail ties are distributed as desired according to the original or the modified rail tie distribution plan. While FIG. 21 shows that a solitary unexpected condition is determined, the artisan will understand that the method 300 involve the encountering of multiple unexpected conditions.

In embodiments, the system 200 may be self-learning, i.e., it may improve its rail tie distribution over time as additional data is gathered. For example, where run time data indicates that it is preferable to have the primary assignee and backup car be adjacent each other, the planning engine 226 may take this finding into account in creating future tie distribution plans.

Figure 22:
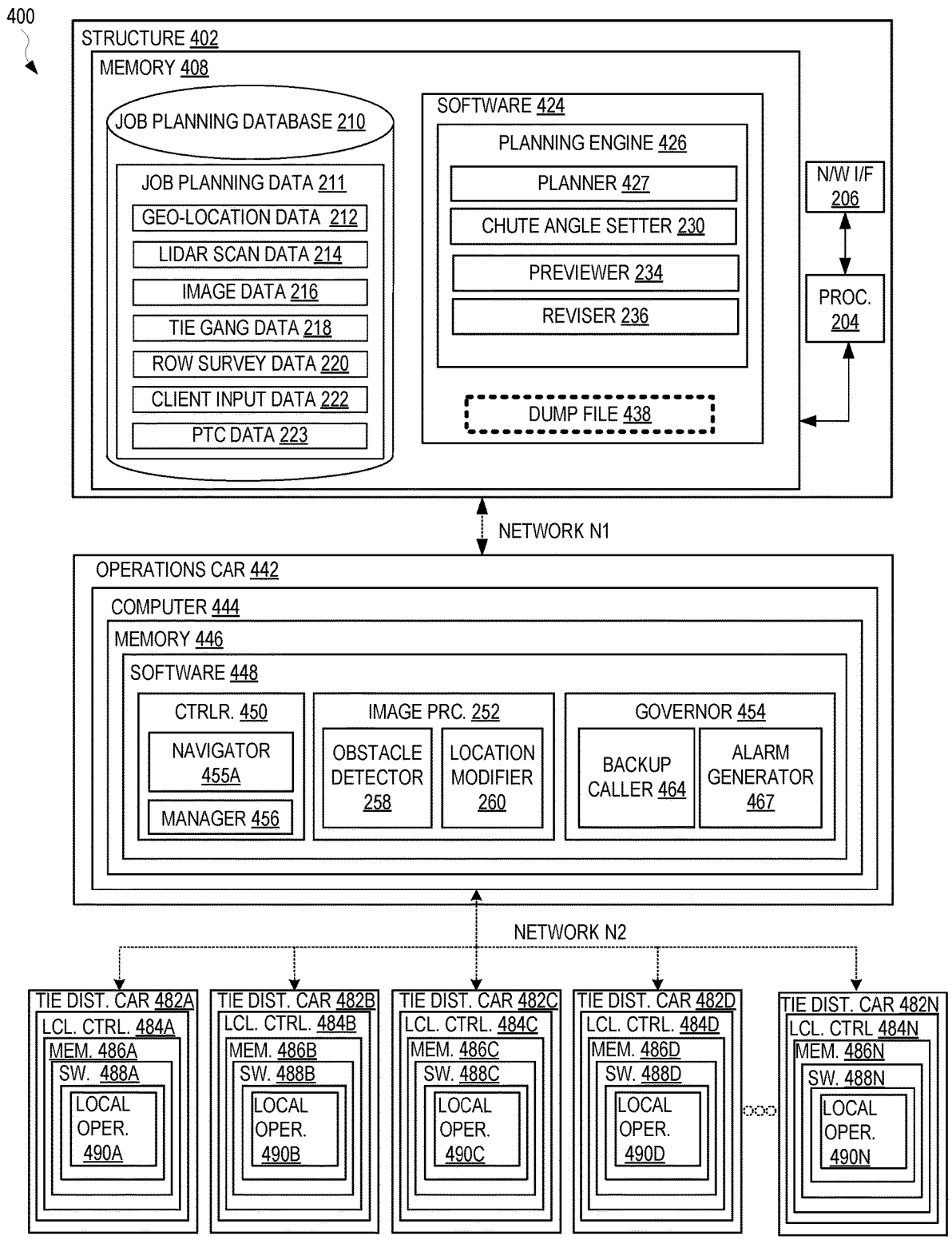
FIG. 22 is a schematic showing a rail tie distribution system having a structure, an operations car, and a consist of rail tie distribution cars, according to another embodiment.

Focus is directed now to FIG. 22, which shows a rail tie distribution system 400 that is an alternate embodiment of the rail tie distribution system 200 (FIG. 15) discussed above. The rail tie distribution system 400 may be substantially similar to the rail tie distribution system 200, except as specifically noted and/or shown or would be inherent. One of skill in the art will understand that the rail tie distribution system 200, and thus the rail tie distribution system 400, may be modified in various ways, such as by incorporating all or part of any of the various described embodiments, for example. For uniformity and brevity, corresponding reference numbers may be used to indicate corresponding parts, though with any noted deviations. For example, the geo-location data 212 of system 400 may be identical to geo-location data 212 of system 200, the chute angle setter 230 of system 400 may be identical to chute angle setter 230 of system 200, the planning engine 426 of system 400 may correspond to the planning engine 226 of system 200 except as described herein, the operations car 442 of system 400 may correspond to the operations car 242 of system 200 except as described herein, and so on.

The rail tie distribution system 400 comprises a structure 402, an operations car 442, and a plurality of rail tie distribution cars 482A, 482B, 482C, 482D, and 482N. As discussed above for rail tie distribution cars 282A-282N, rail tie distribution cars 482A-N may be rail tie distribution cars 2, rail tie distribution cars 152, and/or any number of other suitable rail tie distribution cars.

The structure 402 may be usable to create a rail tie distribution plan for the distribution of rail ties 4 along the side of the track 290 by the rail tie distribution cars 482A-N. As shown, the structure 402 has a memory 408, which corresponds to memory 208 of structure 202. In the illustrated embodiment, the memory 408 comprises the job planning database 210 and software 424. The job planning database 210 is the same job planning database discussed above for system 200, and may include one or more of different types of data usable by the software 424 to generate a rail tie distribution plan. The rail tie distribution plan of system 400 is illustrated in FIG. 22 as dump file 438.

The software 424 includes a planning engine 426. The planning engine 426 includes the chute angle setter 230, the previewer 234, and the reviser 236, discussed above for system 200, and a planner 427. The primary differences between the planning engine 426 and the planning engine 226 are that the planning engine 426: (a) includes the planner 427 instead of the architect 228; and (b) is devoid of the backup assigner 232. In the rail tie distribution system 400, backups may be assigned by the software 248 of the operations car 242 and/or a tie distribution car 482A-482N may proactively choose to serve as the backup based on availability.

As discussed above for system 200, the architect 228 may evaluate data in the job planning database 210, such as geo-location data 212, tie gang data 218, client input data 222, et cetera, to determine the total number of ties in need of replacement and the tie drop off locations, and further, assign a specific one of the tie distribution cars 282A-282N to each tie drop off location. The tie distribution plan/dump file 438 generated by the planning engine 426 may differ from the dump file 238 in that the tie distribution plan 438 may not include assignments of tie distribution cars 482A-482N to tie drop off locations. Rather, in this embodiment and as discussed herein, the operations car 442 may assign the appropriate tie distribution car to each tie drop off location while the tie distribution cars 482A-482N are in motion.

In more detail, the tie distribution plan 438 may include a drop off location of each rail tie that is to be distributed by the tie distribution cars 482A-482N. The drop off location may be identified in the plan 438 using a geographic coordinate system (e.g., latitude and longitude). The plan 438 may additionally indicate whether the rail tie 4 at a particular drop off location is to be dropped off by a tie distribution car at the left side or the right side of the track 290. Further, the plan 438 may indicate the directional point of view of the plan 438 (e.g., for a track 290 that goes east to west, outline whether the plan is created for a consist traversing east or west on the track 290); the artisan will appreciate that a plan 438 created for a consist intended to traverse the track 290 in one direction may need to be flipped (i.e., reversed) where the consist traverse the track 290 in the opposite direction, to ensure each rail tie 4 is distributed to the intended side of the track 290.

In some embodiments, the chute angle setter 230 may be omitted from the planning engine 426 and the tie distribution means (e.g., chute 59) of all tie distribution cars 482A-482N may be maintained at the same angle for the distribution of all the ties 4. Alternately, the chute angle of one car 482A-482N may be set to a first angle for the duration of the job, the chute angle of another car 482A-482N may be set to another angle for the duration of the job, and so on. In embodiments where a chute angle setter 230 is employed, the tie distribution plan 438 may further include the chute angle associated with each tie drop off location, to ensure each tie 4 is dropped off at the appropriate location notwithstanding uneven terrain. This plan 438, including the drop off location of each tie (e.g., each of the absolute location identified by geographical coordinates and the location of the tie relative to the track 290 (such as left of track or right of track)), and optionally, a chute angle associated with each drop off location, may be stored in the dump file 438 and communicated to the operations car 442 over the network N1.

The operations car 442 may have a computer 444 and a memory 446 which may generally correspond to the computer 244 and memory 246. The memory 446 may have software 448, which in the illustrated embodiment has a consist controller 450, an image processor 252, and a governor 454. The operations car 442 may traverse the track 290 together with the rail tie distribution cars 482A-482N. In embodiments, the functionality of the computer 444 is incorporated in a tie distribution car (e.g., one of tie distribution cars 482A-482N).

The controller 450 has a navigator 455A and a manager 456. Once the consist comprising the operations car 442 and the rail tie distribution cars 482A-482N begins to traverse the section of the track 290 being repaired, the navigator 455A determines the heading of the consist on the track 290 (e.g., if the track goes from north to south, determines whether the consist is traveling north or south along the track). As noted, the plan 438 may have been created from a particular directional point of view, i.e., may have been created for a consist intended to travel in a specific direction along the track 290. The direction of travel of the consist on the day of the repair may be set by the railroad after the plan 438 has been generated, and therefore, the consist may end up traveling in a direction opposite to what is envisaged by the plan 438. In such case, the navigator 455 may "flip" the tie distribution plan 438 to ensure that the rail ties 4 are distributed to their intended locations notwithstanding the direction of travel of the consist. In some embodiments, the dump file 438 communicated to the computer 444 may contain two plans—a plan created for a consist traversing the track 290 in a first direction, and a flipped plan created for a consist traversing the track 290 in the opposite direction—and the navigator 455A may select the appropriate plan 438 while the consist is in motion based on the heading of the consist.

The manager 456 may manage or oversee the distribution of rail ties 4 along the track 290. In embodiments, the manager 456 determines the speed at which the consist is traversing the track 290, as such would affect the tie drop off operation (e.g., affect whether a particular car will have reset prior to reaching the next tie drop off location). The manager 456 may have a buffer into which the plan 438, and specifically the rail tie drop off locations, are fed. In one embodiment the buffer is a first in first out (FIFO) buffer.

As the consist comprising the operations car 442 and the tie distribution cars 482A-482N traverses the section of the track 290 being repaired, the manager 456 may assign one of the tie distribution cars 482A-482N to each upcoming tie drop off location. The assigned tie distribution car 482A-482N may subsequently drop off the tie at the location dictated by the plan 438 (which may be a specific point along the track 290, a specific area (e.g., a 2 foot by 2 foot area) along the track 290, et cetera) as the assigned tie distribution car passes by the drop off location while the consist is in motion. Once the tie 4 is dropped off at the appropriate location, the tie distribution car 482A-482N that distributed the tie 4 may signal to the manager 456 that the tie 4 has been distributed to the desired location. The manager 456 may turn to the next upcoming drop off location and assign a tie distribution car 482A-482N to this location. Alternately, the manager 456 may assign one rail tie distribution car to each of a plurality (e.g., two, three, ten, et cetera) of successive rail tie drop off locations and assign cars to new tie drop off locations after one or more preceding tie drop off locations have been addressed.

The manager 456 may take one or more of several guiding principles into account when assigning a particular car to a particular drop off location. In one embodiment, the manager 456 always assigns the next available tie car to each upcoming tie drop off location. Assume, for example, a consist having four tie distribution cars 482A, 482B, 482C, and 482D. Assume further that the consist traverses the track 290 such that the tie distribution car 482A passes each upcoming tie drop off location prior to the distribution cars 482B-D. In this example, unless the tie distribution car 482A is unavailable (e.g., a tie 4 has not yet been fed against the stops 171 at the indexing mechanism 157 or 167 after discharging another tie, has a jam, is out of ties 4, et cetera), the manager 456 will always assign the tie distribution car 482A to the upcoming tie drop off location. Where the tie distribution car 482A is unavailable to distribute a tie 4 at the upcoming location, the manager 456 may query the next car in the consist, i.e., car 482B, to determine whether it is available to distribute the tie 4 at the upcoming location, and if so, direct the car 482B to distribute the tie 4 to the upcoming location. Alternately, if both cars 482A and 482B are unavailable, the manager 456 may then query the successive car 482C, and so on. Once a tie 4 has been distributed at the desired location, the manager 456 may update its records to indicate that a tie 4 has been distributed to the particular location.

In some embodiments, instead of the manager 456 dictating the assignment of cars 482A-482N to particular tie drop off locations, the next available car may proactively distribute a tie to the appropriate location based on a determination by its local controller (e.g., local controllers 484A-484N of cars 482A-482N, respectively) that: (a) the car is available to distribute the tie 4 to the location; and (b) the car is the first available car in the consist to distribute the tie 4 to the particular location. When the tie 4 has been distributed, the car distributing the tie 4 may send a signal to the manager 456 and/or the remaining cars indicating that the tie drop off location has been addressed. The manager 456 and/or the software 488A-488N of the cars 482A-482N may include programming instructions to ensure that multiple cars are not unduly assigned to the same tie drop off location.

As noted, in some embodiments the guiding distribution principle centers around the first available car 482A-482N. In these embodiments, the car 482A-482N that is first to pass each tie drop off location (i.e., one of car 482A and 482N) is most likely to have its reserve of ties 4 depleted prior to the tie reserves of the other tie distribution cars. Similarly, once the reserve of ties 4 of this car is depleted, the reserve of ties 4 of the successive car are most likely to next be depleted prior to the reserves of the other tie distribution cars, and so on.

Tie distribution in other embodiments of the system 400 may be guided by a different principle. For example, the guiding distribution principle may require that each tie distribution car 482A-482N have the same or about the same number of ties 4 in reserve (i.e., each tie distribution car 482A-482N weigh about the same as other cars) as such may negate issues that may arise where the weights of tie distribution cars 482A-482N are substantially different from each other. These guiding principles, which are provided here as examples, may be selected in line with a particular application.

The image processor 252 may have an obstacle detector 258 and a location modifier 260, which are detailed above with respect to system 200. The image processor 252 may be omitted.

The governor 454 may have a backup caller 464 and an alarm generator 467. The backup caller 464 may assign and activate a backup based on a determination that the car 482A-482N originally assigned to a tie drop off location has failed to distribute a tie 4 at that location (e.g., because it is jammed, because its reserves of ties 4 is depleted, et cetera). The backup caller 464 may be guided by the same guiding principle guiding the manager 456 (e.g., where the guiding principle centers on the first available car, the backup caller 464 may likewise select the next available car subsequent to a determination that the original assignee has failed to deliver a tie 4 as desired). In some embodiments, the system 400 may have a designated backup car (e.g., the last tie distribution car to pass each tie drop off location).

The backup caller 464 may ensure that a tie 4 is dropped off at the designated tie drop off location, or if that is not possible, a tie 4 is dropped off proximate the tie drop off location as soon as practicable. From time to time, and depending on the speed at which the consist traverses the track 290, each of the assigned car 482A-N and the backup car 482A-482N may fail to distribute a tie to a particular location, and this failure may not be registered until after the consist has passed the tie drop off location. In such case, the backup caller 464 may cause the closest available car 482A-482N to drop a tie 4 as soon as feasible, even if the tie 4 is no longer distributed to the intended location. Such may ensure that the tie gang subsequently repairing the track has access to the appropriate number of ties 4 for completing the job at hand, even if some of the ties 4 are not located at the originally designated tie drop off location.

Where a tie 4 is not distributed at the designated location, or alternately, where a given number of ties 4 (e.g., two ties, five ties, et cetera) are not distributed at the designated locations, the governor 454, and specifically the alarm generator 467 thereof, may generate an alarm. The alarm may be an audible alarm, a visual alarm, or a combination of both. For example, in some embodiments, the alarm generator 467 may auto-dial a mobile device of a foreman or other responsible individual. Alternately or additionally, the alarm generator 467 may use the network (e.g., network N1 or N2) to communicate the alarm to a supervisor's computer. The speed of the consist may be slowed down in response to the alarm as the alarm may indicate that the consist is moving too fast for the ties 4 to be distributed as desired.

The tie distribution cars 482A-N, as illustrated, have local controllers 484A-484N, memory 486A-486N, and software 488A-488N having local operators 490A-490N. These components are substantially similar to tie distribution cars 282A-282N and components 284A-284N, 286A-286N, 288A-288N, and 290A-290N, except as described herein. For example, in embodiments of the system 400, and unlike the local operators 290A-290N of the cars 282A-282N, the local operators 490A-490N of cars 482A-482N may distribute a tie 4 at an appropriate location without being instructed to do so by the consist controller 450 and then report same to the consist controller.

Figure 23:
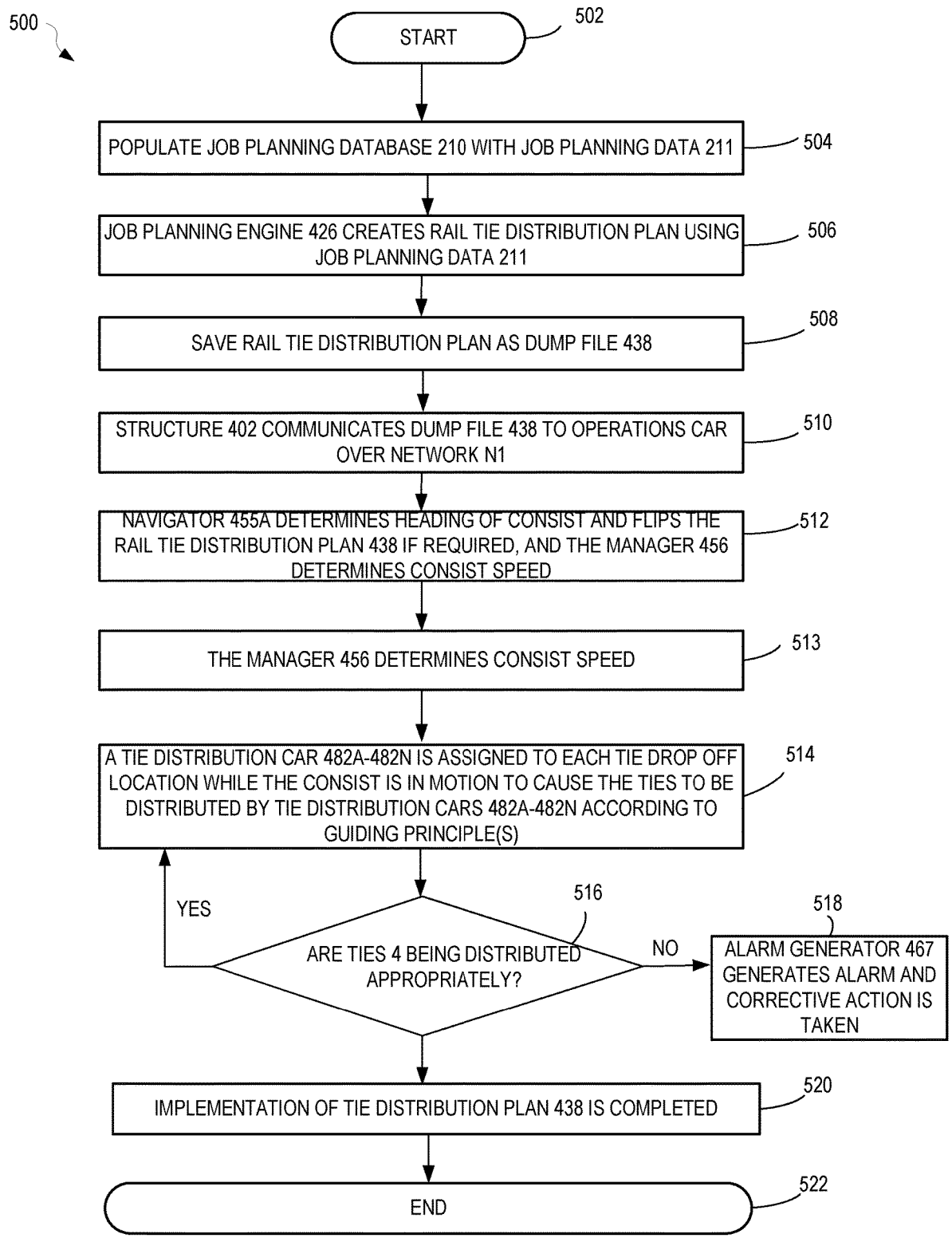
FIG. 23 is a flowchart illustrating a method of using the rail tie distribution system of FIG. 22 to distribute rail ties along a side of a track.

FIG. 23 is a flowchart illustrating a method 500 of using the rail tie distribution system 400 to distributes ties 4 to a section of the track 290.

The method 500 may begin at step 502. At step 504, job planning data 211 in the job planning database 210 may be populated, as discussed above.

Next, at step 506, the software 424, and specifically the planning engine 426 thereof, may create a rail tie distribution plan using some or all of the job planning data 211. At step 508, the rail tie distribution plan may be saved as a dump file 438. The rail tie distribution plan 438 may identify the geographic location of each tie 4 that is to be distributed. The rail tie distribution plan 438 may further include a chute angle for distribution of the tie 4 at each drop off location, an intended direction of travel of the consist, and the side of the track 290 at which each tie 4 is to be distributed. Unlike the plan 238 of system 200, the rail tie distribution plan/dump file 438 may not include primary and backup car assignments as such will be generated in real time while the consist is in motion.

At step 510, the dump file 438 may be communicated by the structure 402 to the operations car 442 over the network N1.

At step 512, once the consist comprising the operations car 442 and the tie distribution cars 482A-482N is in motion, the navigator 455A may determine the heading of the consist (i.e., identify, out of two possible directions the consist can traverse the track 290, the current direction of travel). This direction of travel may be selected on the day of the repair based, e.g., on track availability and other factors.

As discussed above, the tie distribution plan 438 may be created for a consist intended to traverse the track 290 in a specific direction. If the actual direction of travel of the consist is opposite of the travel direction based on which the tie distribution plan 438 was created, the plan may be flipped so that the ties 4 are distributed at the locations set out by the plan 438 notwithstanding the opposite direction of travel of the consist.

At step 513, the manager 456 may determine the speed at which the consist is traversing the track, and such substantially impacts the tie distribution operation. Step 513 may be effectuated prior to step 512.

At step 514, while the consist is in motion, a tie distribution car 482A-482N may be assigned to each tie drop off location as the consist approaches that tie drop off location. As discussed, the assignment of tie distribution cars 482A-482N to tie drop off locations may be based on one or more guiding principles. For example, the guiding principle may dictate that the first available car 482-482N is to drop off the tie 4 to each upcoming drop off location. Or, for instance, the guiding principle may prescribe that each car 482A-482N is to have in reserve an equal or generally equal number of ties 4, as such may alleviate concerns associated with trains traveling with cars having mismatched weights.

After each tie 4 or series of ties 4 is distributed, at step 516 the governor 454 may check whether the ties 4 are being distributed as desired. If so, the method may return to step 514 to distribute additional ties 4. On the other hand, if a tie 4 or a given number of ties 4 is determined to not have been distributed appropriately, the alarm generator 467 may sound an alarm. Corrective action may be taken in response to the alarm, e.g., a speed of the consist may be decreased to allow for ties 4 to be appropriately distributed, the consist may be stopped for inspection, et cetera.

At step 520, the implementation of the tie distribution plan 438 may be completed. The method 500 may end at step 522. While not expressly shown in FIG. 23, where imagers are present, the image processor 252 may be used to avoid any obstacles that have unexpectedly appeared at or proximate a drop off location as discussed for method 200.

Thus, as has been described, the rail tie distribution systems (e.g., systems 200 and 400) disclosed herein may generate a rail tie distribution plan, cause this plan to be implemented, and optionally, adaptively modify the plan to ensure that the ties 4 are distributed safely and efficiently. Importantly, each of system 200 and 400 may selectively assign any one of a plurality of rail tie distribution cars in a consist to distribute a rail tie to a particular location, increasing operational flexibility and efficiency relative to prior art tie distribution systems.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A rail tie distribution consist comprising:
 a plurality of rail tie distribution cars in which a plurality of rail ties may be stored, each of the plurality rail tie distribution cars including;

a rail tie feeder;
a rail tie singulating means; and
a rail tie discharge means; wherein
the rail tie feeder feeds rail ties from the rail car to the rail tie singulating means, the rail tie singulating means singulates rail ties received from the rail tie feeder and advances the rail ties individually to a discharge means operable to selectively discharge individual rail ties outward from a side of the rail tie distribution car.

2. The rail tie distribution consist as in claim 1, wherein, for each of the plurality of rail tie distribution cars, said discharge means is operable to selectively discharge rail ties outward from each side of the rail tie distribution car.

3. The rail tie distribution consist as in claim 2 further comprising a rail tie distribution car controller operably associated with each of the rail tie distribution cars to control the operation of the rail tie discharge means of each of the rail tie distribution cars, the consist further comprising a computing resource communicatively coupled to each of the rail tie distribution car controllers, the computing resource having a rail tie distribution plan comprising a plurality of drop off locations stored therein, the computing resource configured to implement the rail tie distribution plan by selecting, for each of the rail tie drop off locations, one of the plurality of rail tie distribution cars in the consist from which to discharge a rail tie, and selectively operating the discharge means of the selected one of the plurality of rail tie distribution cars to discharge the rail tie at the respective rail tie drop off location.

4. The rail tie distribution consist as in claim 1, wherein, for each of the plurality of rail tie distribution cars, said discharge means is operable to selectively discharge rail ties out each side of the rail tie distribution car and sidewalls are secured to the rail tie distribution car on opposite sides of the rail tie feeder and the rail tie singulating means with a rail discharge opening extending adjacent to or through each of the sidewalls in lateral alignment with the discharge means.

5. The rail tie distribution consist as in claim 1 further comprising a rail tie distribution car controller operably associated with each of the rail tie distribution cars to control the operation of the rail tie discharge means of each of the rail tie distribution cars, the consist further comprising a computing resource communicatively coupled to each of the rail tie distribution car controllers, the computing resource having a rail tie distribution plan comprising a plurality of drop off locations stored therein, the computing resource configured to implement the rail tie distribution plan by selecting, for each of the rail tie drop off locations, one of the plurality of rail tie distribution cars in the consist from which to discharge a rail tie, and selectively operating the discharge means of the selected one of the plurality of rail tie distribution cars to discharge the rail tie at the respective rail tie drop off location.

6. The rail tie distribution consist as in claim 5 further comprising a monitoring device communicatively coupled to the computing resource and operable to detect and communicate to the computing resource an unexpected condition, the computing resource altering the rail tie distribution plan based on the unexpected condition communicated to the computing resource.

7. The rail tie distribution consist as in claim 5 further comprising at least one imager communicatively coupled to the computing resource and operable to collect an image of each of the selected rail tie drop off locations, the computing resource programmed to decline to operate the discharge means of the selected one of the plurality of rail tie distribution cars in response to a determination of an unexpected condition at one of the selected drop off locations based upon an image of the selected drop of location collected by the imager.

8. The rail tie distribution consist as in claim 5 wherein said discharge means of each rail tie distribution car in the consist comprises a discharge chute and each said rail tie distribution car controller is operable to control an angle of the discharge chute of the respective rail tie distribution car in response to a determination of an unexpected condition at one of the selected drop off locations.

9. The rail tie distribution consist as in claim 1 wherein the plurality of rail tie distribution cars comprises at least three rail tie distribution cars.

10. A rail tie distribution system comprising:
a rail tie distribution car in which a plurality of rail ties may be stored, the rail tie distribution car including;
a rail tie feeder;
a rail tie singulating means; and
a rail tie discharge means comprising a chute which is pivotally mounted and selectively positionable to slope downward toward either side of the rail car; wherein
the rail tie feeder feeds rail ties from the rail car to the rail tie singulating means, the rail tie singulating means singulates rail ties received from the rail tie feeder and advances the rail ties individually to a discharge means operable to selectively discharge individual rail ties outward from a side of the rail car.

11. A rail tie distribution consist comprising a plurality of rail tie distribution cars, each of the plurality of rail tie distribution cars including:
a floor conveyor sized to receive a plurality of rail ties thereon and extending at least partially across a lower portion of the rail rail tie distribution car, the floor conveyor having an upper conveyor run advancing to a discharge end of the floor conveyor;
a singulating conveyor assembly on the rail tie distribution car positioned to receive rail ties conveyed off an end of the floor conveyor, the singulating conveyor assembly advancing rail ties individually to a to a dealer mounted between the singulating conveyor assembly and a discharge chute, the dealer selectively releasing individual rail ties onto the discharge chute, the discharge chute oriented to discharge each rail tie released thereon outward from a side of the rail tie distribution car.

12. The rail tie distribution consist as in claim 11, wherein said discharge chute is operable to selectively discharge rail ties outward from each side of the rail tie distribution car.

13. The rail tie distribution consist as in claim 12 further comprising:
a controller operably associated with each of the rail tie distribution cars to control the operation of the dealer of each of the rail tie distribution cars, the consist further comprising a computing resource communicatively coupled to the controller of each of the plurality of rail tie distribution cars, the computing resource having a rail tie distribution plan stored therein, the rail tie distribution plan setting a plurality of rail tie drop off locations and the computing resource configured to implement the rail tie distribution plan by selectively operating the dealer of each of the rail tie distribution cars to selectively discharge a rail tie from a selected side of a selected rail tie distribution car at each of the rail tie drop off locations.

14. The rail tie distribution consist as in claim 13 further comprising a monitoring device communicatively coupled to the computing resource and operable to detect and communicate to the computing resource an unexpected condition, the computing resource altering the rail tie distribution plan based on the unexpected condition communicated to the computing resource.

15. The rail tie distribution consist as in claim 13 further comprising at least one imager communicatively coupled to the computing resource and operable to collect an image of each of the selected rail tie drop off locations, the computing resource programmed to override the rail tie distribution plan in real time in response to a determination of an unexpected condition at one of the selected drop off locations based upon an image of the selected drop off location collected by the imager.

16. The rail tie distribution consist as in claim 13 wherein said controller associated with each rail tie distribution car is operable to control an angle of the discharge chute of the respective rail tie distribution car in response to a determination of an unexpected condition at one of the selected drop off locations.

17. The rail tie distribution consist as in claim 11, wherein said discharge chute is operable to selectively discharge rail ties out each side of the rail car and sidewalls are secured to the rail car on opposite sides of the floor conveyor with a rail discharge opening extending adjacent to or through each of the sidewalls in lateral alignment with the discharge chute.

18. The rail tie distribution consist as in claim 11 wherein said singulating conveyor assembly includes a descrambler conveyor comprising a plurality of tie engaging members on a plurality of conveyor chains, the tie engaging members engaging rail ties conveyed from the floor conveyor to the descrambler conveyor, the descrambler conveyor extending upward at an angle relative to the rail tie distribution car and the tie engaging members are sized to engage and sequentially lift individual rail ties and advance the individual rail ties sequentially toward the dealer.

19. The rail tie distribution consist as in claim 11 further comprising:
   a rail tie distribution car controller operably associated with each of the rail tie distribution cars to control the operation of the dealer of each of the rail tie distribution cars, the consist further comprising a computing resource communicatively coupled to the rail tie distribution car controller of each of the plurality of rail tie distribution cars, the computing resource having a rail tie distribution plan stored therein, the rail tie distribution plan setting a plurality of rail tie drop off locations and the computing resource configured to implement the rail tie distribution plan by selectively operating the dealer of each of the rail tie distribution cars to selectively discharge a rail tie from a selected rail tie distribution car at each of the rail tie drop off locations.

20. The rail tie distribution consist as in claim 19 further comprising a monitoring device communicatively coupled to the computing resource and operable to detect and communicate to the computing resource an unexpected condition, the computing resource altering the rail tie distribution plan based on the unexpected condition communicated to the computing resource.

21. The rail tie distribution consist as in claim 19 further comprising at least one imager communicatively coupled to the computing resource and operable to collect an image of each of the selected rail tie drop off locations, the computing resource programmed to override the rail tie distribution plan in real time in response to a determination of an unexpected condition at one of the selected drop off locations based upon an image of the selected drop off location collected by the imager.

22. The rail tie distribution consist as in claim 19 wherein said controller associated with each rail tie distribution car is operable to control an angle of the discharge chute of the respective rail tie distribution car in response to a determination of an unexpected condition at one of the selected drop off locations.

23. The rail tie distribution consist as in claim 11 wherein the plurality of rail tie distribution cars comprises at least three rail tie distribution cars.

24. A rail tie distribution system comprising a rail tie distribution car including:
   a floor conveyor sized to receive a plurality of rail ties thereon and extending at least partially across a lower portion of the rail car, the floor conveyor having an upper conveyor run advancing to a discharge end of the floor conveyor;
   a singulating conveyor assembly on the rail car positioned to receive rail ties conveyed off an end of the floor conveyor, the singulating conveyor assembly advancing rail ties individually to a to a dealer mounted between the singulating conveyor assembly and a discharge chute, the dealer selectively releasing individual rail ties onto the discharge chute, the discharge chute oriented to discharge each rail tie released thereon outward from a side of the rail car; and
   wherein said discharge chute is pivotally mounted and selectively positionable to slope downward toward either side of the rail car.

* * * * *